(12) United States Patent
Maldaner

(10) Patent No.: US 9,264,296 B2
(45) Date of Patent: *Feb. 16, 2016

(54) CONTINUOUS UPGRADING OF COMPUTERS IN A LOAD BALANCED ENVIRONMENT

(71) Applicant: Citrix Systems, Inc., Fort Lauderdale, FL (US)

(72) Inventor: Juliano Maldaner, Delray Beach, FL (US)

(73) Assignee: Citrix Systems, Inc., Fort Lauderdale, DE (US)

( * ) Notice: Subject to any disclaimer, the term of this patent is extended or adjusted under 35 U.S.C. 154(b) by 201 days.

This patent is subject to a terminal disclaimer.

(21) Appl. No.: 13/962,445

(22) Filed: Aug. 8, 2013

(65) Prior Publication Data

US 2013/0326044 A1 Dec. 5, 2013

Related U.S. Application Data

(63) Continuation of application No. 13/100,936, filed on May 4, 2011, now Pat. No. 8,533,337.

(60) Provisional application No. 61/332,172, filed on May 6, 2010.

(51) Int. Cl.
*G06F 15/173* (2006.01)
*H04L 12/24* (2006.01)
*G06F 9/50* (2006.01)

(52) U.S. Cl.
CPC ............. *H04L 41/00* (2013.01); *G06F 9/5083* (2013.01)

(58) Field of Classification Search
CPC .............. G06F 9/5083; H04L 67/1008; H04L 67/1029; H04L 67/1034
USPC ......................................... 709/203, 219, 226
See application file for complete search history.

(56) References Cited

U.S. PATENT DOCUMENTS

| 5,951,694 A | 9/1999 | Choquier et al. |
| 8,180,922 B2 * | 5/2012 | Dini et al. ..................... 709/241 |
| 8,181,071 B2 | 5/2012 | Cahill et al. |

(Continued)

OTHER PUBLICATIONS

Notice of Allowance on U.S. Appl. No. 13/100,936 dated May 8, 2013.

(Continued)

*Primary Examiner* — Phuoc Nguyen
(74) *Attorney, Agent, or Firm* — John D. Lanza; James C. De Vellis; Foley & Lardner LLP

(57) ABSTRACT

The present invention is directed towards methods and systems for performing maintenance on computers included in a group of load balanced computer. A maintenance agent identifies a computers in the group as requiring maintenance, and a second computer as having up-to-date maintenance and a load level below a limit. The load balancer may assign a request to the second computer responsive to the identification. Responsive to a determination that spare capacity from the plurality of computers available to receive requests is above the threshold and that the first computer is idle, the maintenance agent may remove, for maintenance, the first computer from the plurality of computers available to receive requests. The maintenance agent may identify the first computer as having up-to-date maintenance responsive to the maintenance.

18 Claims, 13 Drawing Sheets

(56) References Cited

U.S. PATENT DOCUMENTS

| | | | |
|---|---|---|---|
| 8,260,924 B2 | 9/2012 | Koretz | |
| 8,799,431 B2* | 8/2014 | Pabari | 709/223 |
| 2003/0158940 A1* | 8/2003 | Leigh | 709/226 |
| 2006/0031374 A1 | 2/2006 | Lu et al. | |
| 2009/0070489 A1 | 3/2009 | Lu et al. | |
| 2009/0245113 A1 | 10/2009 | Kamiya | |
| 2011/0276695 A1* | 11/2011 | Maldaner | 709/226 |

OTHER PUBLICATIONS

Office Action on U.S. Appl. No. 13/100,936 dated Dec. 20, 2012.

* cited by examiner

CONTINUOUS UPGRADING OF COMPUTERS IN A LOAD BALANCED ENVIRONMENT

RELATED APPLICATIONS

This present application is a continuation of U.S. patent application Ser. No. 13/100,936, "Continuous Upgrading Of Computers In A Load Balanced Environment" filed May 4, 2011, now allowed, which claims the benefit of and priority to U.S. Provisional Patent Application No. 61/332,172, entitled "CONTINUOUS UPGRADING OF COMPUTERS IN A LOAD BALANCED ENVIRONMENT," filed May 6, 2010, which are both incorporated by reference in their entirety.

FIELD OF THE DISCLOSURE

The methods and systems described herein relate generally to updating computers. In particular, the methods and systems relate to updating or maintaining computers in a load balanced environment.

BACKGROUND OF THE DISCLOSURE

Typically, maintenance of computers included in a load balancing scheme includes the removal of those computers from the load balancing scheme. Removal of the computers from the load balancing scheme or environment often includes forcing or requesting that all pending processing requests in a computer cease. In some instances, load balanced computers may receive a processing request from a load balancer server at any given time. Thus, removing a computer may require that the load balancer server stop issuing processing requests. The time it can take to terminate the processes running on a computer can be significant.

In some instances, maintaining load balanced computers can be accomplished using a maintenance window that causes the load balanced service to be unavailable at particular points in time, and sometimes force or cause the termination of any pending requests. Typically these maintenance windows are artificially created by an administrator and involve forcing the termination of all services so that maintenance can be performed on all computers in the group at the same time. Using a maintenance window to maintain load balanced computer may not be suitable for all workloads. Further, there are drawbacks to using maintenance windows such as the inability to terminate a request. Furthermore, service unavailability may be undesirable, i.e. for an environment that needs a system that is operative twenty-four hours a day, seven days a week. In some embodiments, utilization patterns of a service may be unpredictable, resulting in difficulty in scheduling a maintenance window. A compromise, such as providing a short maintenance window, may be inadequate for handling a large group of computers. Still other drawbacks may include difficulty or inability in handling certain exceptions, and/or a requirement that a maintenance window starts and ends during non-working hours.

Still another method can include manually removing computers from a group of load balanced computers. Drawbacks to this method include the risk involved with an unanticipated need for a longer period of time to perform maintenance. There exists a need for a method of maintaining load balanced computers that avoids the drawbacks of present methods.

SUMMARY OF THE DISCLOSURE

In certain aspects described herein are methods and systems for automating a maintenance event rollout to a group of load balanced computers. The methods and systems, in some embodiments, may not need additional computing resources, and can limit the risk that the load balanced group will become under-provisioned at any point in time. In some instances, the methods and systems described herein may maximize all aspects of the load balancing/maintenance process by reducing the number of computers subject to load balance to a minimum number, increasing the number of "maintenance pending" computers that can be removed from the group to a highest number, increasing user experience by not requiring the termination of user resources, and/or substantially reducing the risk that requests may fail due to an overloaded computer. The methods and systems disclosed further address the drawbacks of using a maintenance window by using a method that removes a load balanced computer from a group of load balanced computers, and applies scheduled and needed modifications to that computer. In some aspects, a maintenance agent selects computers marked as "maintenance pending," removes them from the group of load balanced computers, applies updates and modifications to the computers, marks them as "fully maintained," and launches them back into the group of load balanced computers.

In one aspect, the disclosure is related to a method for updating a plurality of computers in a load balanced environment. A maintenance agent may identify to a load balancer a first computer as requiring maintenance, the first computer identified from a plurality of computers available to receive requests from the load balancer. The maintenance agent may identify to the load balancer a second computer as having (i) up-to-date maintenance and (ii) a load level below a predetermined load limit, the second computer identified from the plurality of computers. The load balancer may assign a request to the second computer responsive to the identification that the second computer has a load level below the predetermined load limit and that the first computer requires maintenance. The load balancer may determine that spare capacity from the plurality of computers available to receive requests is above a threshold. The load balancer may determine that the first computer is idle. Responsive to the determination that (i) the spare capacity from the plurality of computers available to receive requests is above the threshold and (ii) the first computer is idle, the maintenance agent may remove, for maintenance, the first computer from the plurality of computers available to receive requests. The maintenance agent may identify the first computer as having up-to-date maintenance responsive to the maintenance.

In some embodiments, the load balancer determines the threshold based on utilization of the plurality of computers. The maintenance agent may detect that the first computer is due for at least one of: a patch update, disk image update, program installation or removal, a service update, a security check, storage maintenance, memory or cache clean-up, configuration update, physical component repair, and data corruption repair. The load balancer may be configured to preferably assign a request to a computer having up-to-date maintenance rather than a computer requiring maintenance. The load balancer may assign a request to the first computer if the second computer has a load level above the predetermined load limit and the first computer has a load level below the predetermined load limit.

In some embodiments, the load balancer allows the first computer to complete processing of requests assigned to the first computer, the requests assigned prior to identification that the first computer lacks up-to-date maintenance. The maintenance agent may request maintenance and processing status of at least one computer from the plurality of computers. The maintenance agent may update a maintenance status of the first computer in a table tracking maintenance status of at least some of the plurality of computers, and tagging on the first computer the maintenance status of the first computer, the maintenance status indicating that maintenance is not up-to-date. In certain embodiments, the maintenance agent may modify a load balancing policy of a plurality of policies that the load balancer uses to assign a request. The maintenance agent may determine, responsive to the threshold determination, whether to remove a third computer identified as requiring maintenance, from the plurality of computers for maintenance.

In another aspect, the present disclosure is related to a system for updating a plurality of computers in a load balanced environment. The system includes a load balancer and a maintenance agent in communication with the load balancer. The maintenance agent executes on a computing device. The maintenance agent may identify a first computer as requiring maintenance, the first computer identified from a plurality of computers available to receive requests from the load balancer. The maintenance agent may identify a second computer as having (i) up-to-date maintenance and (ii) a load level below a predetermined load limit, the second computer identified from the plurality of computers. The load balancer may assign a request to the second computer responsive to the identification that the second computer has a load level below the predetermined load limit and that the first computer requires maintenance. In some embodiments, the maintenance agent removes the first computer from the plurality of computers for maintenance responsive to a determination that (i) spare capacity from the plurality of computers available to receive requests is above a threshold and (ii) the first computer is idle, and identifies the first computer as having up-to-date maintenance responsive to the maintenance.

In some embodiments, the load balancer determines the threshold based on utilization of the plurality of computers. The maintenance agent may detect that the first computer is due for at least one of: a patch update, disk image update, program installation or removal, a service update, a security check, storage maintenance, memory or cache clean-up, configuration update, physical component repair, and data corruption repair. The load balancer may be configured to preferably assign a request to a computer having up-to-date maintenance rather than a computer requiring maintenance. The load balancer may assign a request to the first computer if the second computer has a load level above the predetermined load limit and the first computer has a load level below the predetermined load limit.

In some embodiments, the load balancer allows the first computer to complete processing of requests assigned to the first computer, the requests assigned prior to identification that the first computer lacks up-to-date maintenance. The maintenance agent may request maintenance and processing status of at least one computer from the plurality of computers. The maintenance agent may perform one of: update a maintenance status of the first computer in a table tracking maintenance status of at least some of the plurality of computers, and tag on the first computer the maintenance status of the first computer, the maintenance status indicating that maintenance is not up-to-date. In certain embodiments, the maintenance agent modifies a load balancing policy of a plurality of policies that the load balancer uses to assign a request. The maintenance agent may determine, responsive to the threshold determination, whether to remove a third computer identified as requiring maintenance from the plurality of computers for maintenance.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

DETAILED DESCRIPTION OF THE DRAWINGS

For purposes of reading the description of the various embodiments of the present invention below, the following descriptions of the sections of the specification and their respective contents may be helpful:

Section A describes a network environment and computing environment useful for practicing some embodiments of the present invention;

Section B describes embodiments of systems and methods for load balancing based on metrics collected from servers;

Section C describes embodiments of systems and methods for global server load balancing among devices; and Section D describes embodiments of systems and methods for performing maintenance on computers in a load balanced Environment.

A. Network and Computing Environment

Figure 1A:
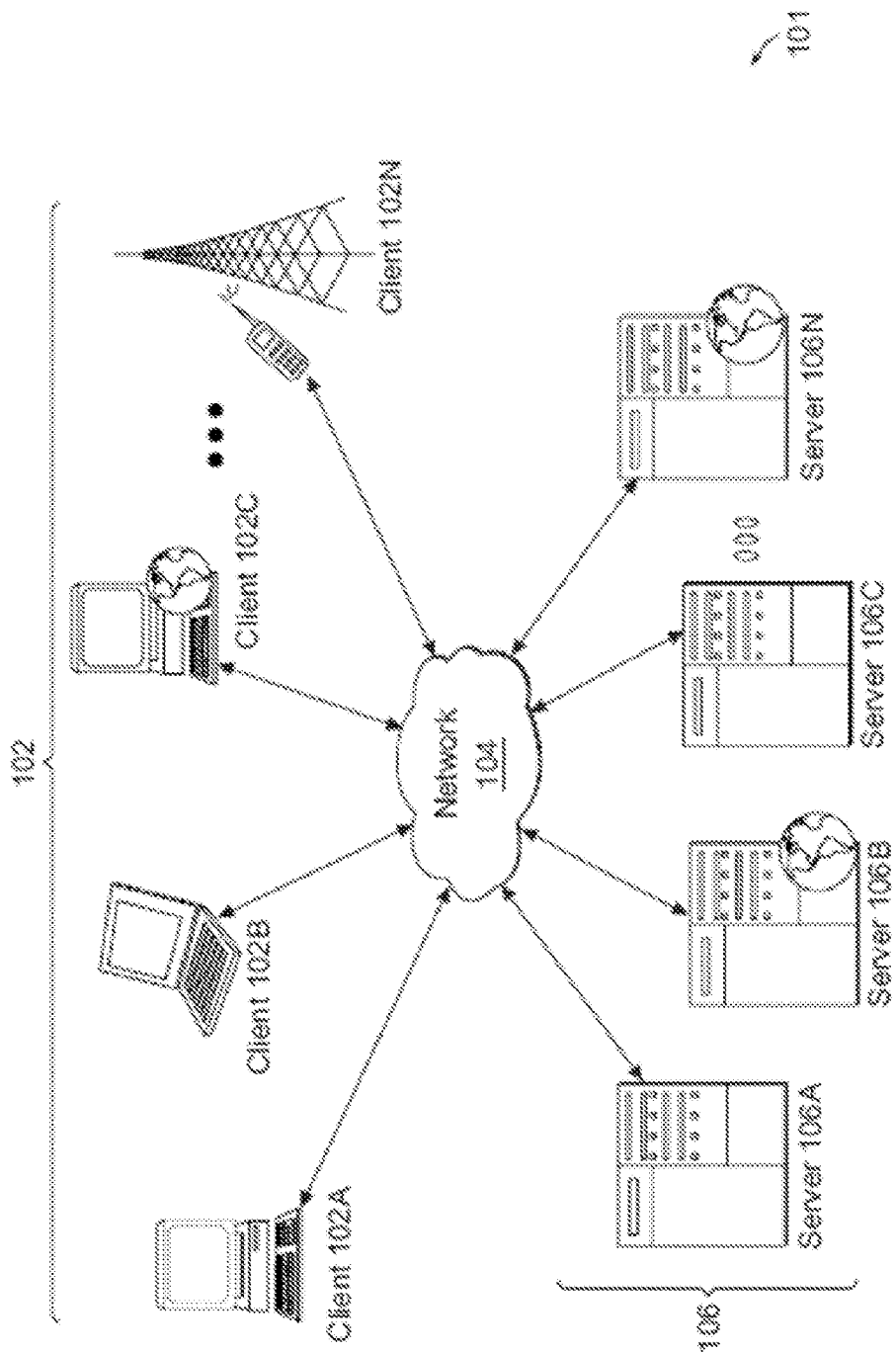
FIG. 1A is a block diagram illustrative of an embodiment of a remote-access, networked environment with a client machine that communicates with a server.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
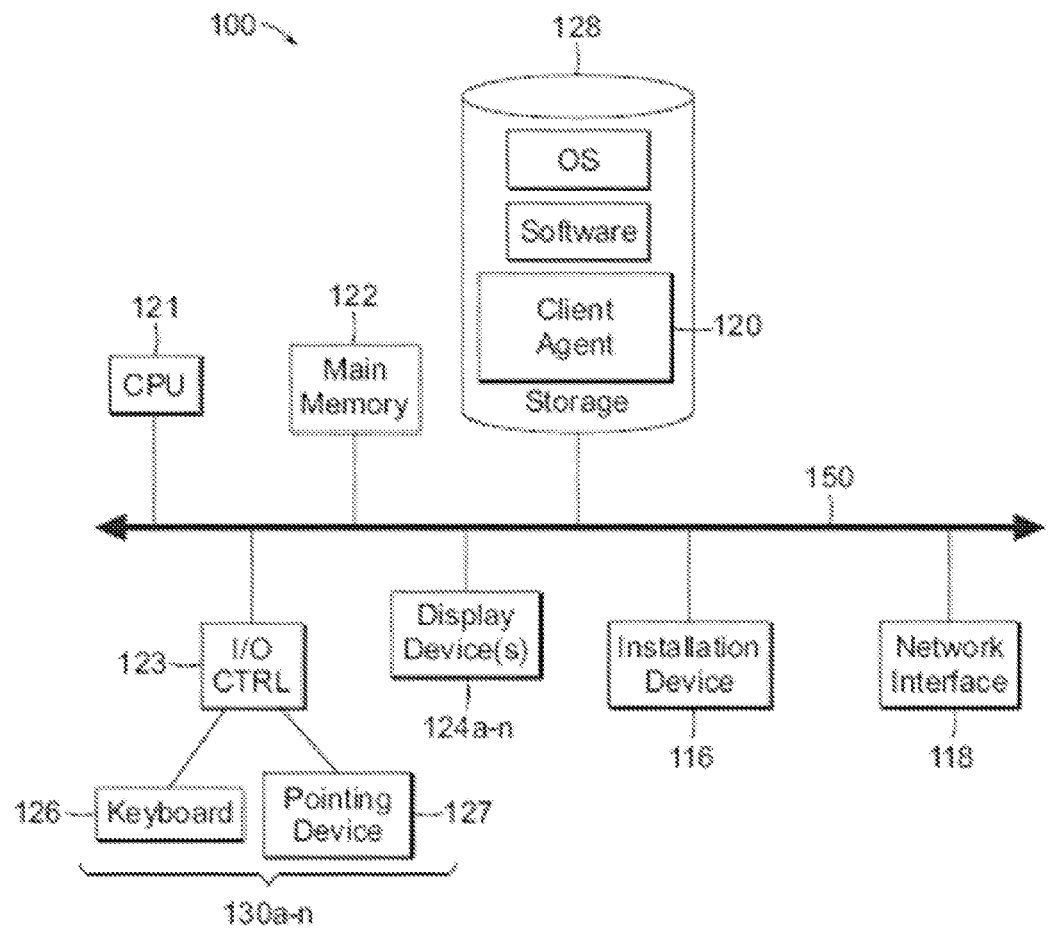
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
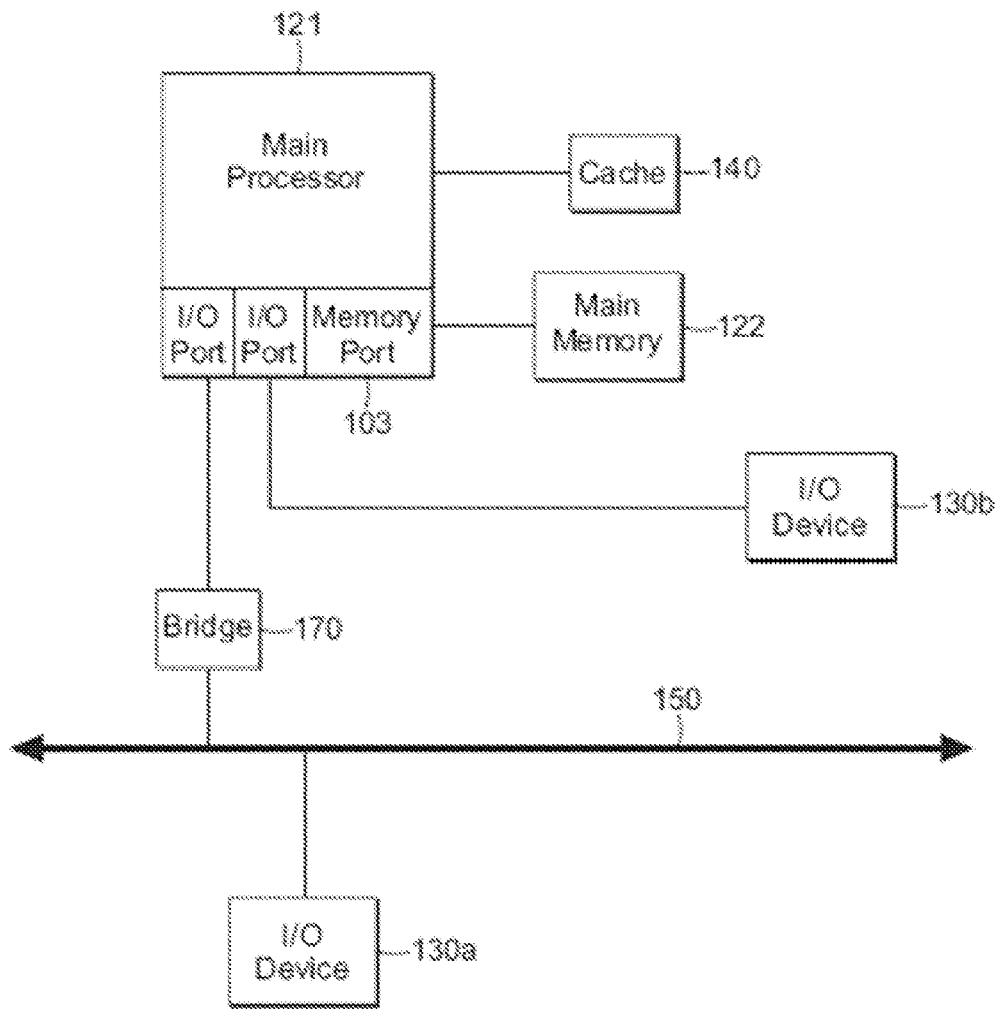

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 1D:
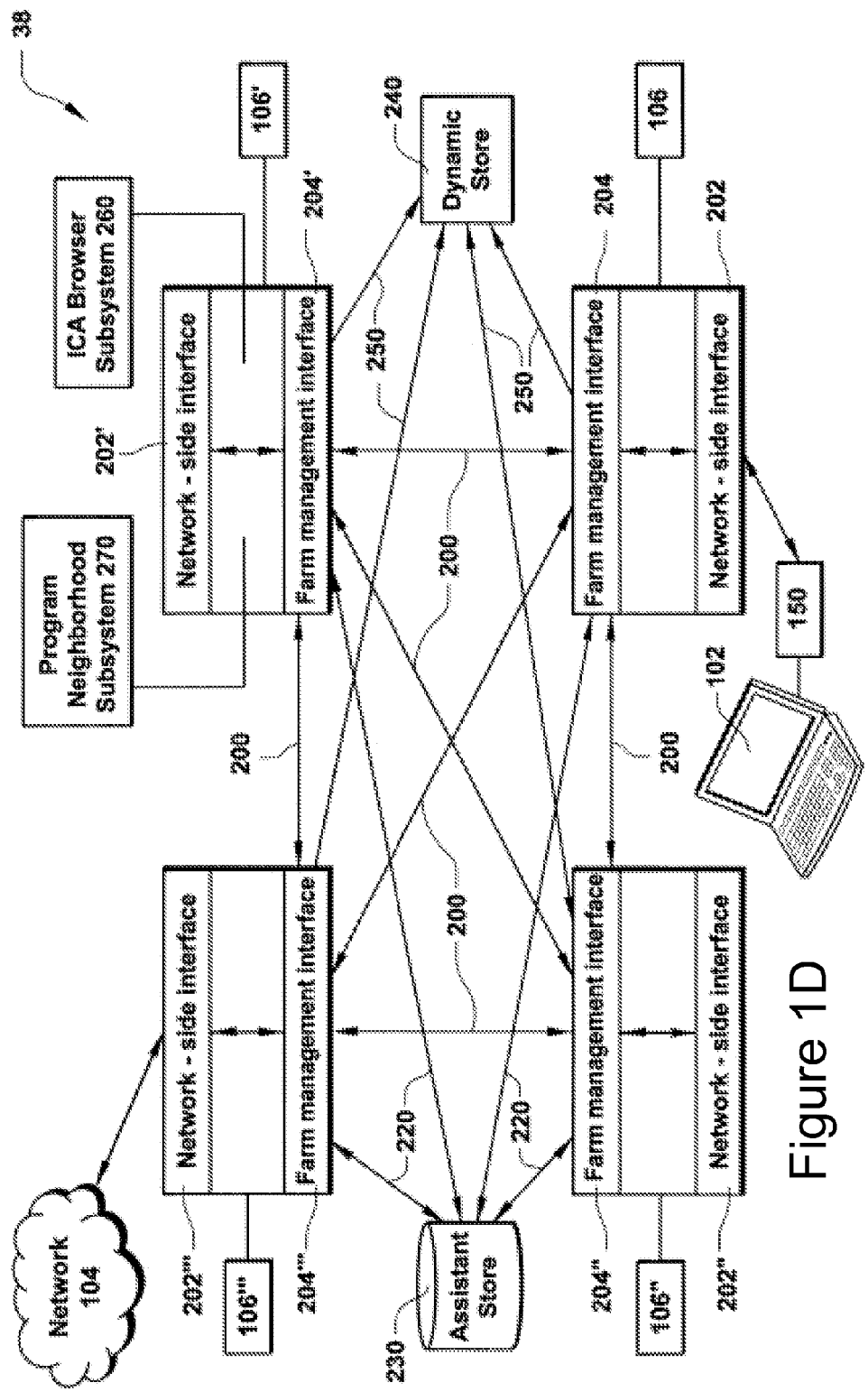
FIG. 1D is a block diagram depicting an embodiment of a server farm.

Referring now to FIG. 1D, one embodiment of an environment comprising a plurality of servers may be suitably managed by a load balancing system. This environment may illustrate aspects of interfaces, connections, components and communications that can be suitably adapted for use by a load balancing system. The plurality of servers 106 may comprise a farm 38 or server farm, where each server 106 can include a network-side interface 202 and a farm-side interface 204. The network-side interface 202 can be in communication with one or more clients 102 or a network 104. The network 104 can be a WAN, LAN, or any other embodiment of a network such those networks described above.

Each server 106 has a farm-side interface 204 connected with one or more farm-side interface(s) 204 of other servers 106 in the farm 38. In one embodiment, each farm-side interface 204 is interconnected to other farm-side interfaces 204 such that the servers 106 within the farm 38 may communicate with one another. On each server 106, the farm-side interface 204 communicates with the network-side interface 202. The farm-side interfaces 204 can also communicate (designated by arrows 220) with a persistent store 230 and, in some embodiments, with a dynamic store 240. The combination of servers 106, the persistent store 230, and the dynamic store 240, when provided, are collectively referred to as a farm 38. In some embodiments, a server 106 communicates with the persistent store 230 and other servers 106' communicate with the server 106 to access information stored in the persistent store.

The persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each server 106 in farm 38 and global data used by all servers 106 within the farm 38. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that do not change frequently, i.e., data that change only on an hourly, daily, or weekly basis, or data that never change. Each server uses a persistent storage subsystem to read data from and write data to the persistent store 230.

The data stored by the persistent store 230 may be replicated for reliability purposes physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 106 may be predetermined according to one or more criteria. For example, servers 106 may store different types of data based on their boot order. In other embodiments, the type of data stored by a server 106 may be configured by an administrator using an administration tool. In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106" can operate as a collector point for licensing information and for loading information. In these embodiments, each collector point may amass a different type of run-time data. For example, to illustrate this case, the server 106'" can collect licensing information, while the server 106" collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 260 also supports requests made by clients 10 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 516 described in connection with FIG. 6 below, providing program neighborhood functionality on a server 106.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the client over the program neighborhood virtual channel. Then the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 sends the request to the program neighborhood subsystem 270, which selects a server 106 in the farm 38. Address information associated with the server 106 is identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 270 pushes program neighborhood information updates to the client 102. To obtain updates, the program neighborhood subsystem 270 subscribes to events from the common application subsystem 524 to allow the program neighborhood subsystem 270 to detect changes to published applications.

Figure 1E:
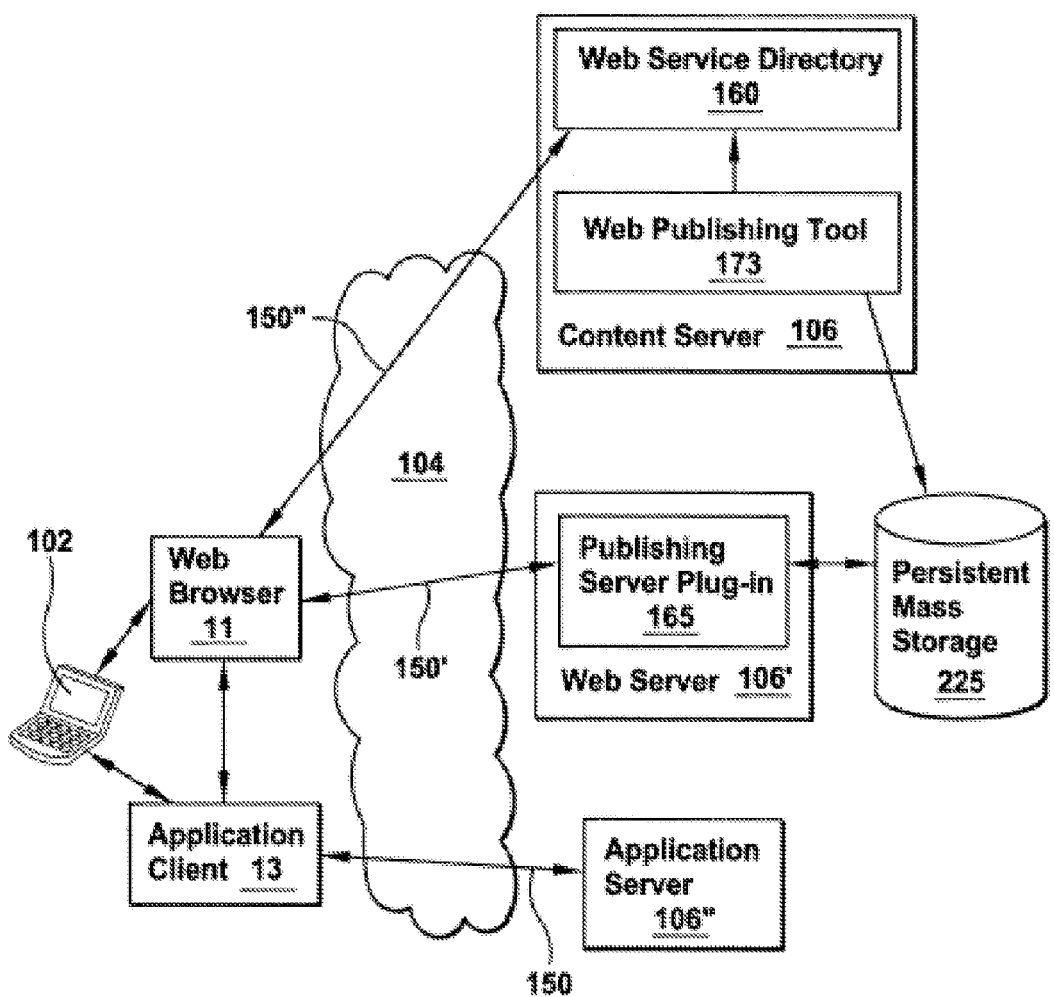
FIG. 1E is a block diagram depicting one embodiment of a system for providing a plurality of application programs available to the client via publishing of GUIs in a web service directory.

Referring to FIG. 1E, a block diagram depicts an embodiment of a system for providing a plurality of application programs which may be part of a load balanced environment. This system may illustrate aspects of interfaces, connections, components and communications suitably adapted for use by a load balancing system. The system includes the client 102, and a plurality of servers 106. A first server 106 functions as a content server. A second server 106' provides web server functionality, and a third server 106" provides functionality for providing access to application files and acts as an application server or a file server. The client 102 can download content from the content server 106, the web server 106', and the application server 106" over the network 104. In one embodiment, the client 102 can download content (e.g., an application) from the application server 106" over the client-application server communication channel 150.

In one embodiment, the web browser 11 on the client 102 uses Secure Socket Layer (SSL) support for communications to the content server 106 and/or the web server 106'. SSL is a secure protocol developed by Netscape Communication Corporation of Mountain View, Calif., and is now a standard promulgated by the Internet Engineering Task Force (IETF). The web browser 11 can connect to the content server 106 and/or the web server 106' using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the IETF. In other embodiments, the web browser 11 communicates with the servers 106 using a communications protocol without encryption, such as the HyperText Transfer Protocol (HTTP).

The client 102 can additionally include an application client 13 for establishing and exchanging communications with the application server 106" over the client-application server communication channel 150. In one embodiment, the application client 13 is a GUI application. In some embodiments, the application client 13 is an Independent Computing Architecture (ICA) client, developed by Citrix Systems, Inc. of Fort Lauderdale, Fla., and is also referred to below as ICA client 13. Other embodiments of the application client 13 include a Remote Display Protocol (RDP) client, developed by Microsoft Corporation of Redmond, Wash., an X-Windows client 13, a client-side player, interpreter or simulator capable of executing multimedia applications, email, Java, or .NET code. Moreover, in one embodiment the output of an application executing on the application server 106" can be displayed at the client 102 via the ICA client 13. In some embodiments, the application client 13 is an application client such as the application streaming client 552, described in greater detail in connection with FIG. 5.

The client 102 searches the web service directory 160 for a web service. In one embodiment, the search is a manual search. In other embodiments, the search is an automatic search. The web service directory 160 may also provide a service based view, such as white and yellow pages, to search for web services in the web service directory. In another embodiment, the web service directory 160 supports a hierarchical browsing based on a structured service name and service kind for GUI applications. In one embodiment, the web service directory 160 executes on a server independent of the content server 106, such as a directory server. In other embodiments, the web service directory 160 executes on multiple servers.

In some embodiments, the content server 106 enables the client 102 to select web services based on additional analysis or information by providing this information or analysis in the web service directory 160. Examples of service information that the web service directory 160 can list includes, but is not limited to, the name of the business offering the service, the service type, a textual description of the service, one or more service access points (SAPs), the network type, the path to use (e.g., TCP or HTTPS), and quality of service (QoS) information. Moreover, service information can be client device type or user (e.g., role) specific. Thus, service selection can be based on one or more of the above attributes.

In one embodiment, the service type denotes a programming interface that the client 102 uses to access the web service. For instance, the service type can state that the service is encoded by an interface description language, such as Web Services Description Language (WSDL).

The service access point, or SAP, is a unique address for an application. The SAPS enable the computer system to support multiple applications at the client 102 and each server 106. For example, the application server 106" may support an electronic mail (i.e., e-mail) application, a file transfer application, and/or a GUI application. In one embodiment, these applications would each have a SAP that is unique within the application server 106". In one embodiment, the SAP is a web or Internet address (e.g., Domain Name System (DNS) name, IP/port, or Uniform Resource Locator (URL)). Thus, in one embodiment the SAP identifies the address of the web server 106' as part of the address for an application stored on the web server 106'. In some embodiments, the SAP identifies the address of a publishing server plug-in 165 as part of the address for an application stored on the web server 106', as described below. In one embodiment, the SAP is an "accessPoint" from the UDDI registry.

To prepare an item for publishing in the web service directory 160, the content server 106 includes a web publishing tool 170. In one embodiment, the web publishing tool 173 is a software module. In other embodiments, the web publishing tool 173 is another server that may be externally located from or internally located in the content server 106.

In one embodiment, the web server 106' delivers web pages to the client 102. The web server 106' can be any server 106 capable of providing web pages to the client 102. In another embodiment, the web server 106' is an Enterprise Information Portal (e.g., corporate Intranet or secured business-to-business extranet). Enterprise portals are company web sites that aggregate, personalize and serve applications, data and content to users, while offering management tools for organizing and using information more efficiently. In some companies, portals have replaced traditional desktop software with browser-based access to a virtual workplace.

The web server 106' can also include a publishing server plug-in 165 to enable the publishing of graphical user interface (GUI) applications. More specifically, the publishing server plug-in 165 translates a new web service entry URL into a GUI application service so that the GUI can be accessed via the web service directory 160. In one embodiment, the publishing server plug-in 165 is a Common Gateway Interface (CGI) script, which is a program designed to accept and return data that conforms to the CGI specification. The program can be written in any programming language, such as C, Perl, Java, or Visual Basic. In another embodiment, the publishing server plug-in 165 is a Java Server Page (JSP). Using the publishing server plug-in 165 to facilitate the publishing of remote GUI applications, the client 102 can thereby access the web service, not through a programming interface or a web page, but through a full GUI interface, such as with Citrix's ICA or Microsoft's RDP.

The application server 106" hosts one or more applications that are available for the client 102. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

In some embodiments, one or more communication links 150 are established over different networks. For example, the client-content server communication channel 150' can belong to a first network (e.g., the World Wide Web) and the client-web server communication channel 150" can belong to a second network (e.g., a secured extranet or Virtual Private Network (VPN)).

In one embodiment, the web publishing tool 173 stores information about an application that the web publishing tool 173 is currently publishing in the web service directory 160 in a persistent mass storage 225. In one embodiment the information is a URL for the dynamic publishing server plug-in 165. The persistent mass storage 225 may be a magnetic disk or magneto-optical drive. In one embodiment, the persistent mass storage 225 is a database server, which stores data related to the published application in one or more local service databases. The persistent mass storage 225 may be a component internally located in or externally located from any or all of the servers 106.

In other embodiments, the content server 106 or the web server 106' communicate with a server 106 in the farm 38 to retrieve the list of applications. In one of these embodiments, the content server 106 or the web server 106' communicate with the farm 38 instead of with the persistent mass storage 225.

B. Load Balancing with Metrics Collected from Servers

Figure 2A:
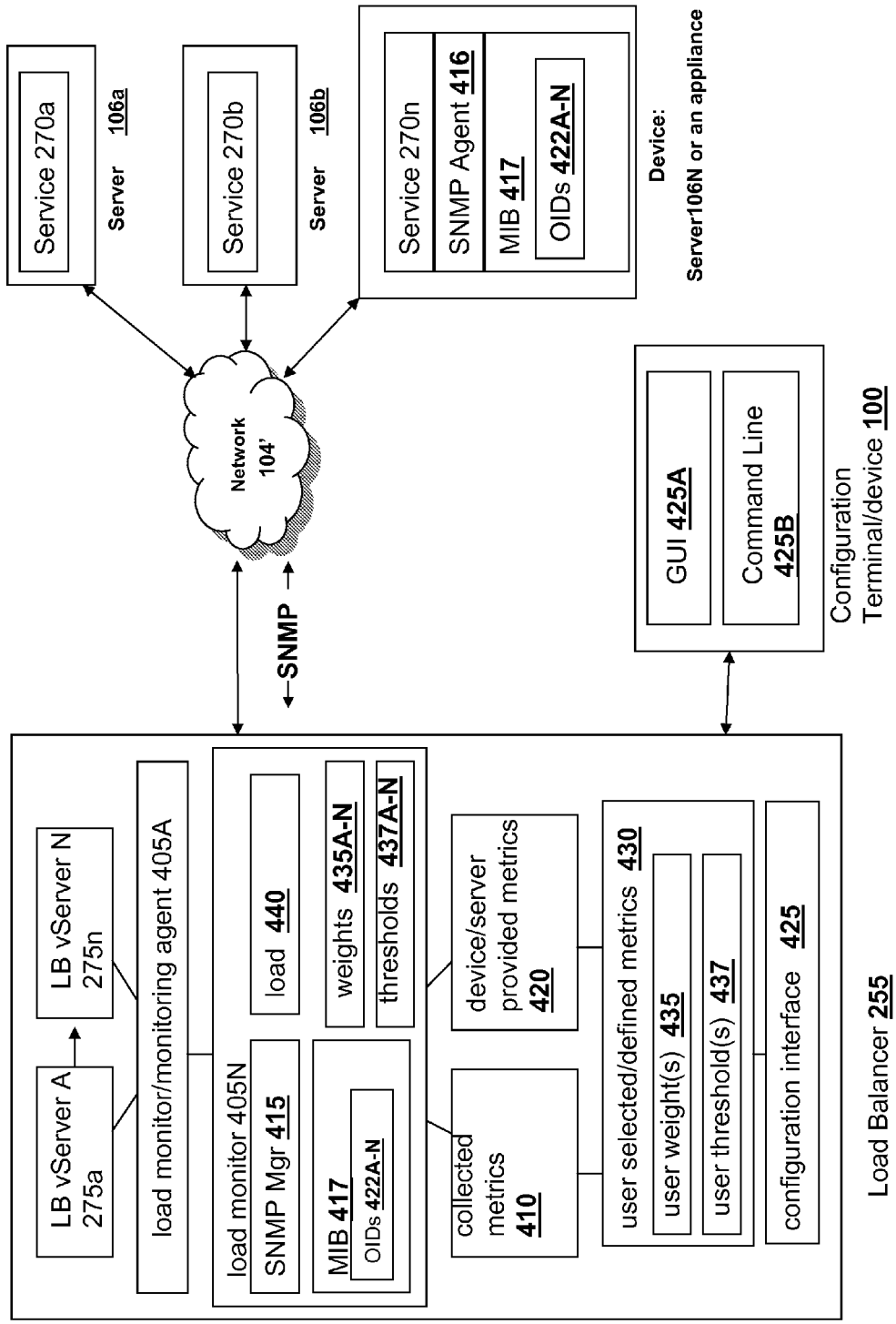
FIG. 2A is a block diagram of an embodiment of a system for collecting metrics via a network management protocol and for determining a load of services based on the metrics.
Figure 2B:
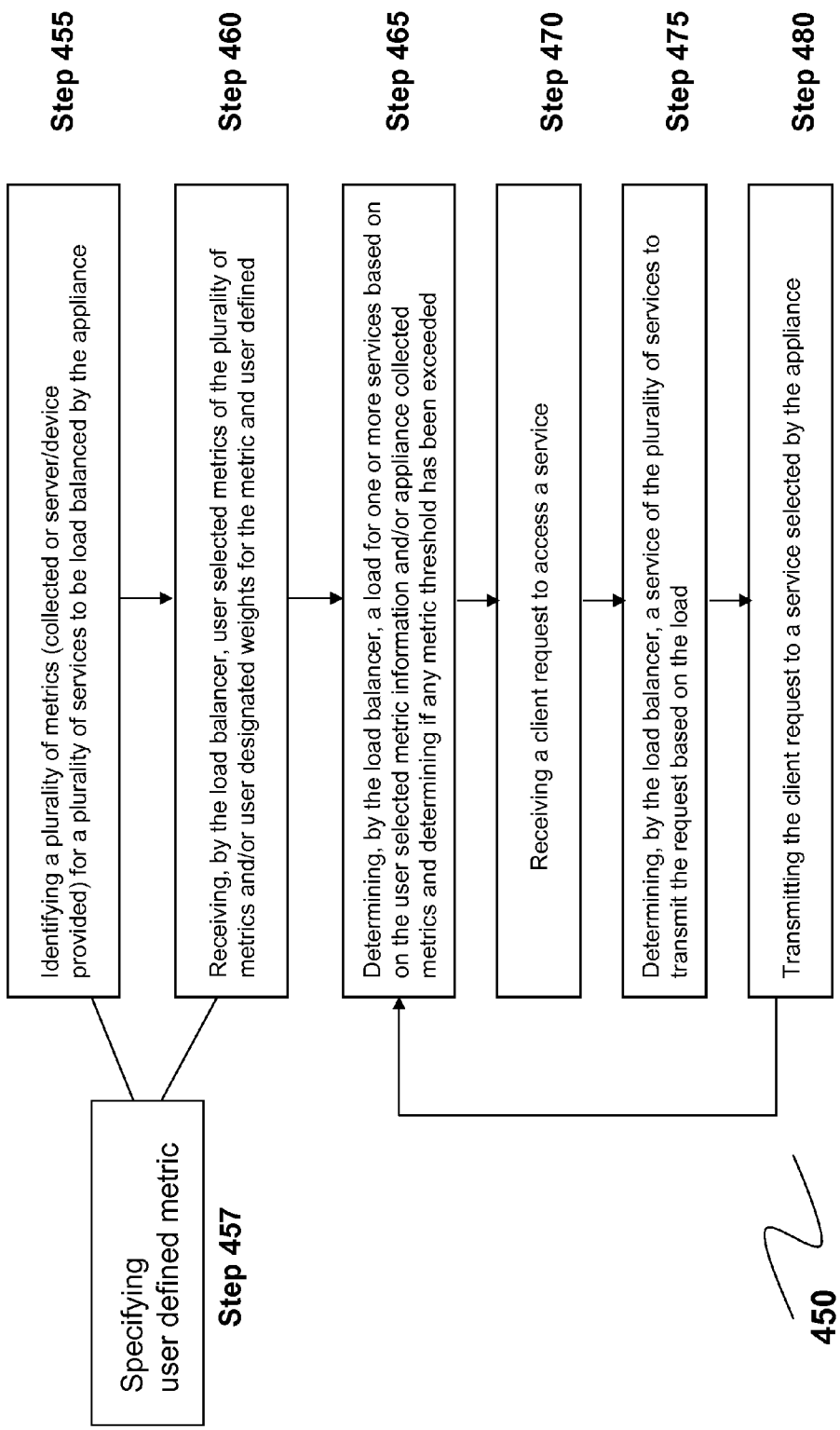
FIG. 2B is a flow diagram of an embodiment of steps of a method for performing load balancing based on collected metrics.

Referring now to FIGS. 2A and 2B, systems and methods are depicted for load balancing based on metrics determined and/or collected by a load balancer 255 from a device or service. These metrics may be collected via a network management protocol, such as a Simple Network Management Protocol (SNMP). The load balancer 255 provides a load monitor to monitor the load of one or more server computers 106 or services 270a-270n. In one embodiment, a user may configure one or more load monitors based on metrics selected from a custom metric table which includes metrics or objects obtained via a network management protocol query. In another embodiment, a user may configure one or more load monitors based on metrics or parameters collected by the appliance. In some embodiments, the user configures one or more load monitors based on metrics selected from the custom metric table and the collected metrics. In response to the user's selection, the load balancer 255 determines the load of the one or more computers and load balances client requests to the computers using any type of load balancing technique.

Referring now to FIG. 2A, an embodiment of a load balancer 255 for load balancing one or more services is depicted. In brief overview, a load balancer 255, which may be configured on an appliance or other device, may have one or more virtual servers, or vServers 275A-275N configured to provide load balancing 284 to one or more services 270a-270n deployed on or provided by one or more servers 106a-106b. In various embodiments, although vServers are referenced by way of illustration, the systems and methods described may use any type of processes or processing units. A vServer 275A is associated with, configured to or bound to a service 270A or a group of services 270A-270N. The load balancer 255 has one or more load monitors 405A-405N to monitor a status, operation, and/or performance of the services 270A-270N. A load monitor is associated with, configured to or bound to a service 270A or a group of services 270A-270N. The load monitors 405A-405B provide information to the vServers 275A-275N to determine which of the services 270A-270N should receive a request received by a vServer 275. A load monitor 405 and/or vServer 275 may use collected metrics 410 and/or device provided metrics 420 to determine a load across a plurality of services 270A-270N and to load balancing incoming client requests. The load balancer 255 also includes a configuration interface 435 to receive information identifying user selected or user defined metrics 430 to be used by the load monitors 405 and/or vServers 275 for load balancing the plurality of services 270A-270N.

The load balancer 255 may include any type and form of load monitor 405A-405N, also referred to as monitoring agent, for monitoring any operational or performance characteristic or metric of a service 270, server 106 or device 100. A load monitor 405 may include software, hardware, or any combination of software and hardware. The load monitor 405 may include any application, program, script, service, daemon, process, task, thread or set of executable instructions. In one embodiment, the load monitor 405 operates or executes in kernel space of the load balancing device 255. In another embodiment, the load monitor 405 operates or executes in user or application space of the load balancer 255. In some embodiments, a first portion of the load monitor 405 operates in kernel space while a second portion of the load monitor 405 operates in application layer or space of a load balancing appliance or device 255.

In one embodiment, the load monitor 405 communicates with a service 270. In some embodiments, the load monitor 405 monitors or communicates with a service 270 on a predetermined frequency, such as every 1 msec or 1 sec. A user may configure or specify the predetermined frequency via the configuration interface 425. In other cases, another appliance or system may configure or specify the predetermined frequency via the configuration interface 425. In yet another embodiment, the load monitor 405 monitors or communicates with a service 270 responsive to one or more events, such as receipt of a request, response or a network packet. In one embodiment, a load monitor 405 monitors or communicates with a service 270 responsive to one or more policies of a policy engine.

In some embodiments, a load monitor 405 may use a request/reply messaging mechanism or protocol with the service 270 or server 106. In other embodiments, a load monitor 405 may have a custom or proprietary exchange protocol for communicating with a service, server or device. In one embodiment, a load monitor 405 may use the protocol of the service 270 to monitor or communicate with the service 270. As such, in some embodiments, the load monitor 405 uses the HTTP protocol to monitor or communicate with a web service 270A. In yet other embodiments, the load monitor 405 uses a TCP or ICMP protocol for monitoring a service 270. In some embodiments, the load monitor 405 uses a network management protocol to monitor or query a status or metric of a service, server or device. In one embodiment, the load monitor 405 uses a Simple Network Management Protocol (SNMP). In another embodiment, the load monitor 405 uses a common management information protocol (CIMP).

In some embodiments, one load monitor 405 monitors a plurality of services 270A-270N, or servers 106A-106B. In other embodiments, a plurality of load monitors 405A-405N monitor a single service 270A or server 106A. In still other embodiments, multiple load monitors 405 may each monitor a plurality of services 270A-270N, or servers 106A-106N. In one embodiment, multiple load monitors 405 may each monitor a service 270. In yet another embodiment, a load monitor 405A may monitor one or more other load monitors 405B-405N.

In some embodiments, the one or more load monitors 405 are associated with one or more services 270. In one embodiment, a user specifies or configures a load monitor 405 for one or more service 270 via the configuration interface 425. For example, a user via the configuration interface 435 may issue a command to bind the monitor 405 to a service 275. In other embodiments, the load monitor 405 is associated with a vServer 275. In one embodiment, a user specifies or configures via the configuration interface 425 a load monitor 405 for a vServer 275. In yet another embodiment, a use specifies or configures via the configuration interface 425 a vServer 275 for one or more services 270A-270N. For example, a user may bind a vServer 275 to a service 270.

In some embodiments, the one or more load monitors 405 may monitor an appliance, vServer 275, network service 270, client 102, server 106, device 100 or any other network resource. In one embodiment, a user specifies a type of network service to associate with the one or more monitoring agents 405. In another embodiment, a user customizes a monitoring agent. For example, a user may implement or otherwise provide a script for monitoring a service. In still another embodiment, a generic monitoring agent 405 is used. In some embodiments, a monitor agent 405 is configurable to use a predetermined monitor, script or status message based on a type of protocol or type of service In yet another embodiment, the one or more monitoring agents 405 determine the response time of the one or more network services 270 for responding to a request of one of the following types: ping, transport control protocol (tcp), tcp extended content verification, hypertext transfer protocol (http), http extended content verification, hypertext transfer protocol secure (https), https extended content verification, user datagram protocol, domain name service, and file transfer protocol. In some embodiment, a monitoring agent 405 checks for predetermined status codes in responses from the service 270. In other embodiments, the monitoring agent 405 checks for predetermined string patterns in a response from the service 270.

In some embodiments, the one or more load monitors or monitoring agents 405 are protocol-specific agents. For example, an agent 405 may determine availability for a network service of a particular protocol-type. In some embodiments, a monitoring agent 405 determines a response time of a server 106 or network service 270 to a TCP request. In one of these embodiments, the agent uses a "TCP/ICMP echo request" command to send a datagram to the network service 270, receive a datagram from the network service 270 in response, and determine a response time based on the roundtrip time of the datagram. In another of these embodiments, the monitoring agent 405 verifies that the response from the network service 270 included expected content. In one embodiment, the monitoring agent 405 verifies that the response did not include an error.

In other embodiments, a monitoring agent 405 determines availability of a network service 270 to a UDP request. In one of these embodiments, the agent uses a "UDP echo" command to send a datagram to the network service 270, receive a datagram from the network service 270 in response, and determine a response time based on the roundtrip time of the datagram. In another of these embodiments, the monitoring agent 405 verifies that the response from the network service 270 included expected content and did not contain errors.

In still other embodiments, the monitoring agent 405 determines availability of a network service 270 to an FTP request. In one of these embodiments, the monitoring agent 405 sends an FTP command, such as a "get" command or a "put" command, to the network service 270 and determines a time needed by the network service 270 to respond to the command. In another of these embodiments, the monitoring agent 405 verifies that the response from the network service 270 included expected content, such as contents of a file requested by a "get" command, and did not contain errors.

In yet other embodiments, the monitoring agent 405 determines availability of a network service 270 to an HTTP request. In one of these embodiments, the monitoring agent 405 sends an HTTP command, such as a "get" request for a uniform resource locator (URL) or a file, to the network service 270 and determines a time needed by the network service 270 to respond to the request. In another of these embodiments, the monitoring agent 405 verifies that the response from the network service 270 included expected content, such as the content of a web page identified by a URL. In some embodiment, the monitor agent 405 checks for a predetermined status code. In other embodiments, the monitoring agent 405 checks for a predetermined string pattern in an HTTP response.

In further embodiments, the monitoring agent 405 determines availability of a network service 270 to a DNS request. In one of these embodiments, the monitoring agent 405 sends a DNS request, such as a dnsquery or nslookup for a known network address, to the server 106 or network service 270 and determines a time needed by the server 106 or network service 270 to respond to the request. In another of these embodiments, the monitoring agent 405 verifies that the response from the network service 270 included expected content, such as the domain name of a computing device 100 associated with the known network address. In one embodiment, monitoring agent 405 verifies the response did not have an error.

In some embodiments, the load balancer 255, via a monitoring agent 405 identifies and collects metrics 410 based on network traffic and information traversing a network node. The load balancer 255 or agent 405 may store the collected metrics 410 in any type and form of data storage mechanism in memory and/or disk storage. In one embodiment, the load balancer 255 stores the metrics 410 in a table. In another embodiment, the load balancer 255 stores the metrics 410 in a database. In yet another embodiment, the load balancer 255 stores the metrics 410 in an object or data structure. In still other embodiments, the load balancer 255 stores collected metrics 410 in multiple tables and/or data storage mechanisms. In one embodiments, the collected metrics 410 may be arranged or organized in any manner in the multiple tables.

In some embodiments, the monitoring agent 405 determines one or more metrics 410 from network packets received and transmitted by the load balancer 255. In one embodiment, the monitoring agent 405 determines a number and/or type of connections to one or more services 270 or server 106. In another embodiment, the monitoring agent 405 determines a number of packets transmitted to a service 270 or server 106. In other embodiments, the monitoring agents 405 determines a number of packets received from or transmitted by a service 270 or server 106. In some embodiments, the monitoring agent 405 determines a response time from a service 270 or service. In one embodiments, the monitoring agent 405 determines an average response time. In another embodiment, the monitoring agent 405 determines a number or percentage of loss packets. In other embodiments, the monitoring agent 405 determines a number of errors received from a service or server.

In some embodiments, the monitoring agent 405 determines a bandwidth of a connection to a service 270 or a server 106. In one embodiment, the monitoring agent 405 determines the bandwidth of a connection based on a response time and/or packet loss. In another embodiment, the monitoring agent 405 determines the bandwidth of a connection based on a number of bytes transferred or communicated to and/or form a service 270 or server 106. In one embodiment, the monitoring agent 405 determines the bandwidth based on a number of bytes received from a service or server over a predetermined time period, such as per second. In another embodiment, the monitoring agent 405 determines the bandwidth based on a number of bytes transmitted to a service or server over a predetermined time period. In some embodiments, the monitoring agent 405 determines the bandwidth based on a number of bytes transmitted to and received from a service or server over a predetermined time period.

In some embodiments, the load balancer 255, via a monitoring agent 405 identifies and collects metrics 430 provided by a service, server or device. These metrics 430 may also be referred to as custom metrics or a custom metric table. The load balancer 255 or agent 405 may store the service or device collected metrics 430 in any type and form of data storage mechanism in memory and/or disk storage. In one embodiment, the load balancer 255 stores the metrics 430 in a table. In another embodiment, the load balancer 255 stores the metrics 430 in a database. In yet another embodiment, the load balancer 255 stores the metrics 430 in an object or data structure. In some embodiments, the load balancer 255 stores the custom metrics 430 in the same data storage mechanism as the collected metrics 410. In other embodiments, the load balancer 255 stores the metrics 430 in a different storage mechanism as the collected metrics 410. In still other embodiments, the load balancer 255 stores device provided metrics 420 in multiple tables and/or data storage mechanisms. In one embodiments, the device provided metrics 420 may be arranged or organized in any manner in the multiple tables. For example, the load balancer 255 may maintain a metrics table 420 for each service, device or application.

In one embodiment, the load monitor 405 uses a network management protocol, such as SNMP, to query a server or device for one or more objects identifiers and data for the objects of the object identifiers. By way of example only and not in any way limiting, the load monitor 405 uses an SNMP architecture to provide management information bases (MIBs) 417, which specify management data of a device or device subsystem, such as a service 270, using a hierarchical namespace containing object identifiers 422A-422N for managed objects. In some embodiments, a MIB 417 is a collection of information that is organized hierarchically. MIBs 417 may be accessed using a network-management protocol such as SNMP. An MIB 417 includes managed objects identified by object identifiers 422A-422N. In one embodiment, a managed object (sometimes called a MIB object, an object, or a MIB) is one of any number of characteristics or metrics of a managed device, appliance or system. In some embodiments, a managed objects includes one or more object instances, which correspond to or referred to as variables.

In one embodiment, the MIB 417 hierarchy may be depicted as a tree with a nameless root, the levels of which are assigned by different organizations. In some embodiments, the top-level MIB object IDs may belong to different standards organizations, while lower-level object IDs are allocated by associated organizations. The MIB 417 and/or objects 422A-422N may be arranged, constructed or organized for management across any of layers of the OSI reference model. In some embodiments, the MIB 417 and/or objects 422A-422N provide managed data and information on applications such as databases, email, and web services. Furthermore, the MIB 417 and/or objects 422A-422N may define for any area-specific or appliance specification information and operations, such as for any type of service 270, server 106 or device 100 load balanced or managed by the load balancer 255.

In the example embodiment of SNMP, the SNMP communication model is based on a manager 415 and an agent 416 with a data of management information 417 and management objects 422A-422N. In one embodiment, the manager 415 provides an interface between appliance and the managed system. The agent 416 provides the interface between the manager 415 and the device, system, application, component, element or resource being managed. As illustrated in FIG. 2A, the load balancer 255 may include a manager 415 which requests and obtains object identifiers and values from an agent 416, such as the agent 416 on a server 106. In the example of SNMP, a manager 415 communicates a GET or GET-NEXT message to request information for a specific object. The agent 416, in response to the manager's request, issues a GET-RESPONSE message to the manager 415 with the information requested or an error message. The manager 415 may transmit a SET message to request a change to a value of a specific variable or object 422. The agent 416 may issue a TRAP message to inform the manager 415 of an event, such as an alarm or error on a service 270.

Although generally described in an embodiment of an SNMP network management protocol, the load balancer 255 and/or load monitor 405 may use any type and form of network management protocol and communication model to obtain identifiers and values of information, such as objects or variables, from another device for a managed system, subsystem or service 270. For example, the load balancer 255 may use any of the following protocols and/or communication models: Remote monitoring (RMON), AgentX, Simple Gateway Monitoring Protocol (SGMP), Common management information protocol (CMIP), Common management information service (CMIS) or CMIP over TCP/IP (CMOT).

Furthermore, although a MIB 417 is generally described in reference to a manager/agent communication model for an example network management protocol such as SNMP, the MIB 417 may include any type and form of data storage of object identifiers, variables, parameters or other identifiers of metrics. The MIB 417 may be either protocol dependent or protocol independent. For example, the MIB 417 may comprise a table of metrics for a device or service that can be queried via any type and form of API.

The managed objects or variables provided via the network management protocol may provide any type and form of metrics or operational characteristics of the service, server or device to be used by the appliance for load balancing, or any other function of the load balancer 255. In one embodiment, the device provided metrics 420 may include any of the metrics 410 collected by the load balancer 255 as described above. In another embodiment, the device provided metrics 420 may include any type and form of information on any resource usage of the managed device, service or system. In one embodiment, the metrics 410 include CPU, memory and/or disk usage of the device and/or service 270. In other embodiments, the metrics 420 may include information on a number of connections, sessions or clients of the service 270. In some embodiments, the metrics 420 include any information on any thresholds of the service 270 or server 106, such as a threshold identifying a maximum number of sessions or clients. In yet another embodiment, the metrics 420 include any information on a type of protocol of the service 270. In other embodiments, the metrics 420 include any information on any alarms or errors of the service 270.

In some embodiments, each load monitor 405 includes the load balancer 255 collected metrics 410. For example, the metric table 410 may be implicitly bound to each monitor 405 by default. In other embodiments, a user associates or binds a custom metric table 420 to a monitor 405. In yet another embodiment, a user associates or binds a custom metric table 420 and appliance collected table 410 to a monitor 405. In yet other embodiments, a user may associate or bind any combination of one or more collected metric tables 410 and custom metric tables 420 to one or more load monitors 405.

In some embodiments, a user via the configuration interface 425 may configure or specify for a load monitor 405 one or more object identifiers 422A-422N to obtain values for and store in the metrics 420. For example, the user may specify a user-defined metric 430. In other embodiments, the load balancer 255 or load monitor 405 obtains a list of one or more object identifiers 422A-4222N from a device 100, such as server 106 or service 270. In yet another embodiment, the load balancer 255 includes one or more metric tables 420 with predetermined OIDS 422A-422N for a known device. For example, the load balancer 255 may include a metric table 420 for any one or more of the following appliances or devices: 1) any version of the NetScaler device manufactured by Citrix Systems, Inc. of Ft. Lauderdale, Fla.; 2) any of the appliances, such as BIGIP or WebAccelerator, manufactured by F5 Networks, Inc. of Seattle, Wash.; 3) any of the AppDirector or AppXcel devices manufactured by Radware Ltd of Mahwah, N.J.; 4) any application acceleration and/or security related appliances and/or software manufactured by Cisco Systems, Inc. of San Jose, Calif.

The load balancer 255, vServer 275 and/or load monitor 405 computes, calculates or otherwise determines a load 440 for each service 270 based on any of the metrics from the collected metrics 410 and/or device provided metrics 420. The load balancer 255 may use a weight 435A-435N and a threshold 437A-437N for each of the metrics used in the determination of the load 440. In one embodiment, the load balancer 255 establishes a weight 435 and/or a threshold 437. In other embodiments, a user establishes a weight 435 and/or a threshold 437. For example, in some cases, if a user does not specify a weight for a plurality of metrics, the load balancer 255 equally weights each metric. In one example embodiment, the load balancer 255 determines the load 440 for each service as follows:

Sum(weight of metric/established ceiling value of metric)*(obtained value of metric/established ceiling value of metric))/Sum(weights))

In some embodiments, a metric value may be based on a range of 0-100, or absolute range. In other embodiments, a metric value may not be based on a range of 0-100 or is otherwise relative to the type of metric and possible range of values. For example, a metric identifying a number of connections may have a ceiling or predetermined maximum value of 10,000. In one of these embodiments, the appliance establishes a ceiling value or predetermined upper limit for the metric value. In another of these embodiments, a user via the configuration interface 425 establishes a ceiling value or predetermined upper limit for the metric value. In further embodiments, the established ceiling value may comprise a value less than the actual maximum value for the metric or upper limit of the range value. For example, a user may specify or configure a relative range value based on a desired operational or performance range of a metric.

In some embodiments, if a metric of a service exceeds a user or load balancer provided threshold, the service may be excluded from the load determination or otherwise from a load balancing decision. In other embodiments, if all the metrics of a service exceeds their corresponding thresholds, the service may be excluded from the load determination or otherwise from a load balancing decisions. In yet another embodiment, even if a service exceeds the threshold(s) for one or more of the metrics, the service may be considered in the load determination or otherwise for load selection. In some cases, a client session may be identified as persistent or sticky to a vServer 275 or service 270. In these cases, if a request for the client's sessions is received by the load balancer 255, the load balancer 255 may provide the request to a vServer 275 or service 270 although a metric for the vServer or service has been exceeded.

In still other embodiments, if a threshold of a metric of a service or virtual server has been exceeded, the load balancer 255 may, in response to the threshold being exceeded, redirect the client making the request to another resource. In one embodiment, the load balancer 255 may transmit a URL to the client comprising the address of a server 106 or service 270 such that the client may bypass the load balancer 255 and access the server 106 or service 270 directly. In one embodiment, the load balancer 255 may transmit a URL to the client comprising the address of a second load balancer 255 or another device. In still another embodiment, the load balancer 255 may redirect the client request to a second load balancer 255, device, service or server on behalf of the client.

In some embodiments, if a threshold of a metric of a service or virtual server has been exceeded, the load balancer 255 may, in response to the threshold being exceeded direct a client request to a second virtual server or service. In one embodiment, a second virtual server may be a backup to a primary virtual server. Upon detection of the threshold being exceeded, the appliance may spillover requests and connections to a second virtual server.

Although the load 440 is generally discussed in view of the above equation, the load balancer 255 may use any type and form of load calculation, weighted or not weighted. In some embodiments, the load balancer 255 determines the load using an average of metric values. In other embodiments, the load balancer 255 determines the load 440 using any derivative value of a metric. In another embodiment, the load balancer 255 determines the load 440 using any statistical measure of a metric. In still another embodiment, the load balancer 255 determines the load 440 using any function or computation of a metric. In yet other embodiments, the load balancer 255 may determine a load 440 for each metric. In these embodiments, the load balancer 255 may aggregate, compare or otherwise compute an load 440 based on any type and form of aggregation of a metric's contribution to a load of a service.

In some embodiments, a user configures multiple monitors 405 for a service 270. In these embodiments, the load 440 on the service 270 is a sum of the load of all the monitors. In one embodiment, the sum of the load from multiple monitors 440 is weighted. The load balancer 255 may assign a monitoring 405 a weight. A weight may comprise an integer, decimal, or any other numeric indicator. In some embodiments, a user may configure via the configuration interface 425 the weight corresponding to a monitor 405. In some embodiments, all monitors 405 may be assigned equal weight. In other embodiments, a plurality of monitors 405 may each be assigned different weights. The weights may be assigned to the monitors based on any criteria indicating relative importance, including without limitation the appliance or user determination of the relative importance or value of the monitor in view of the service, reliability of the monitoring mechanism, and the frequency of monitoring.

In one embodiment, a monitoring agent 405 may be assigned a weight based on the relative importance of the service monitored by the appliance. For example, if most user requests in an environment are HTTP requests, a monitoring agent monitoring HTTP availability of a server 106 might be assigned a weight of 10, while a monitoring agent monitoring FTP availability of a server 106 might be assigned a weight of 3. Or, for example, if an administrator placed a high priority on UDP applications, a monitoring agent monitoring UDP availability of a server may be assigned a weight of 20, while a DNS monitoring agent may be assigned a weight of 5.

In some embodiments, an load balancer 255 may compute a sum of the weights of the monitoring agents currently reporting a network service 270 as operational. For example, if five monitoring agents, each assigned a weight of 30, are monitoring a network service 270, and three of the five monitoring agents report the network service 270 as available, the load balancer 255 may determine the sum of the monitoring agents currently reporting the network service 270 as operational to be 90. Or for example, if only two monitoring agents, one with a weight of 20 and the other with a weight of 40, are reporting a server 106 as available, the load balancer 255 may compute the sum of the monitoring agents currently reporting a server 106 as operational to be 60.

The load balancer 255 also includes a configuration interface 425 providing any type and form of interface mechanism for a user, application or system to communicate with the load balancer 255. In one embodiment, the configuration interface 425 includes a command line interface 425B. In another embodiment, the configuration interface 425 includes a graphical user interface 425A. In some embodiments, the configuration interface 425 includes an application programming interface (API) or development toolkit for an application, program or script to communicate with the load balancer 255.

In some embodiments, the load balancer 255 displays the configuration interface 425 via a display of the load balancer 255. In other embodiments, a configuration terminal or device 100 connects to or communicates with the load balancer 255 and displays the configuration interface 425. For example, the configuration device 100 or terminal may connect to the load balancer 255 via a port and IP address of the load balancer 255. The load balancer 255 may provide a web service listening on the port and IP address to serve a page to the user. The served page may provide a user interface for configuring the load balancer 255. In other embodiments, the configuration terminal 100 may connect and communicate with the load balancer 255 via any type and form of connection, including a monitor port, serial port or USB connection.

Via the configuration interface 425, the load balancer 255 may receive information identifying user selected metrics 430 to use in determining the load 440 for one or more services. In one embodiment, the user identifies or selects a metric from a plurality of collected metrics 410. In another embodiment, the user identifies or selects a metric from a plurality of device provided metrics 420. In some embodiments, the user selects one or more metrics from the collected metrics 510 and one or more metrics from the device provided metrics 410. The load balancer 255 may also receive via the configuration interface 425 information identifying a user's selection or designation of a weight 435 for a metric. For example, a user may provide a value of a weight 435 for a metric. In some embodiments, the load balancer 255 receives information identifying a user provided value for a threshold 437.

In operation, the load balancer 255 may use user selected metrics 430 and user provided weights 435 and thresholds 437 for determining the load 440. In another embodiment, the load balancer 255 may use any load balancer 255 established metrics from the collected metrics 410 for determining the load. In one embodiment, a user establishes a weight and/or a threshold for an load balancer provided metric. So although the metric may not be user selected in some embodiments, the user may control or configure the weights 435 and/or thresholds 437 for the metrics 410. In other embodiments, the load balancer 255 may use any combination of user selected metrics 430 and load balancer established metrics 410 for determining the load. In another embodiment, the load balancer 255 may use any combination of user provided weights 435 and/or thresholds 437 and load balancer provided weights 435 and/or thresholds 437 for any metric used for determining the load 440.

Referring now to FIG. 2B, an embodiment of steps of a method for load balancing one or more services is depicted. In some embodiments, the load balancer 255 may load balance one or more services using collected metrics 410 and device provided metrics 420. In other embodiments, the load balancer 255 load balances one or more services based on user selected metrics, weights and/or thresholds. In brief overview, at step 455 of method 450, multiple metrics are identified for load balancing a plurality of services 270A-270N by the load balancer 255. At step 457, in some embodiment, the load balancer 255 receives user defined metrics to collect or monitor for a service 270. At step 460, the appliance receives user selected metrics from the set of identified metrics. The user may also identify weights and/or thresholds for the metric. At step 465, the load balancer 255 determines a load for each of the services based on the user selected metric information. At step 470, the load balancer 255 receives a client request to access a service. At step 475, based on the load determination, the load balancer 255 determines a service from the plurality of services to transmit or forward the client request. At step 480, the load balancer 255 transmits the client's request to the load balancer selected service.

In further details, at step 455, the load balancer 255 identifies metrics to collect and monitor for load balancing one or more services 270A-270N. In one embodiment, the load balancer 255 provides or identifies one or more appliance collected metrics 410. For example, a table 410 may identify metrics collected by the load balancer 255. In another embodiment, the load balancer 255 provides one or more predetermined tables of device provided metrics 420, such as for an appliance of Citrix, F5, Cisco, or Radware. In other embodiments, the load balancer 255 identifies one or more metrics to collect via a network management protocol in an object or variable database, such as an MIB 417 for SNMP. In one embodiment, the load balancer 255 provides a preconfigured or preinstalled MIB 417 for a predetermined device or service 270, such as an application.

In some embodiments, the load balancer 255 queries a device or service 270 to determine available metrics to collect and/or monitor. For example, in one embodiment, the load balancer 255 queries a device or service for available object identifiers 422A-422N. In another embodiment, the load balancer 255 uses a network management protocol, such as SNMP, to query for the identification of objects in a MIB 417. In yet another embodiment, a user via the configuration interface 425 identifies one or more object identifiers 422A-422N to collect and/or monitor from a device or service 270, such as an application.

In some embodiments, at step 457, a user specifies or defines a metric for the load balancer 255 to collect and/or monitor for a service 270. For example, the user may specify via the configuration interface 425 an object identifier in a MIB 417. In other embodiments, a user may configure or implement a load monitor 405 to collect and/or monitor a user-defined or specified metric. In yet another embodiment, a user, such as a network administrator, may configure, specify or implement one or more object identifiers 422 in a MIB 417 deployed on a server 106. In some embodiments, the user may implement an application, program, script, service or other set of executable instructions to collect metrics on the server 106 and store values for the metrics in the MIB 417 on the server 106. For example, the user may execute a program or script to monitor metrics of a service 270 on the server 106 and update the MIB 417 with the collected values. The manager 415 on the load balancer 255 may query the agent 416 on the server for information and/or values of the metrics stored in the server's MIB 417 for the service 270.

At step 460, the load balancer 255 receives information identifying a selection by a user of one or more metrics identified via the load balancer 255. In some embodiments, a user via the configuration interface 425 selects one or more metrics provided via the load balancer 255 to use for load balancing a server 270. In one embodiment, the load balancer 255 provides for selection by the user via the configuration interface 425 any one or more of the collected metrics 410 or device provided metrics 420. A user may configure the load balancer 255 via a command line interface 425B or graphical user interface 425A to use one or more user selected metrics 430 for determining a load 440 or otherwise for load balancing services 270A-270N by the load balancer 255.

In one embodiment, the load balancer 255 receives information identifying that the user selected one or more collected metrics 410. In another embodiment, the load balancer 255 receives information identifying that the user selected one or more device provided metrics 420. In yet another embodiment, the load balancer 255 receives information identifying that the user selected one or more collected metrics 410 and one or more device provided metrics 420.

Furthermore, via the configuration interface 425, the load balancer 255 may receive information identifying a user's designation or establishment of a weight 435 for a metric. In one embodiment, the load balancer 255 receives a user's identification of a weight 435 for a user selected metric 430. In another embodiment, the load balancer 255 receives a user's identification of a weight 435 for a load balancer established metric 410. In other embodiments, the load balancer 255 may receive information identifying a user's designation or establishment of a threshold 437 for a metric. In one embodiment, the load balancer 255 receives a user's identification of a threshold 437 for a user selected metric 430. In another embodiment, the load balancer 255 receives a user's identification of a threshold 437 for an appliance established metric 410.

At step 465, the load balancer 255 determines a load for each of the one or more services. In one embodiment, a load monitor 405 collects and/or monitors one or more of the user selected metrics 430 for a service. In another embodiment, the load monitor 405 collects and/or monitors collected metrics 410. In some embodiments, a load monitor 405 collects metrics via a network management protocol, such as SNMP. In yet another embodiment, multiple load monitors 405A-405N collect and/or monitor metrics for a service 270. In one embodiment, although a user selected one or more metrics 430 for collecting and/or monitoring a service 270, the load balancer 255 collects and monitors any one or more load balancer established metrics 410, such as number of connections, response time, bandwidth, and number of packets, for the service 270.

In some embodiments, a vServer 275 determines the load 440 for each service 270 via metric information collected and monitored by a load monitor 405. In another embodiment, the load monitor 405 determines the load 440 for the service 270 being monitored. The load balancer 255 and/or load monitor 405 may determine the load 440 using a user selected metric 430 weighted by a user designated weight 435. In some embodiments, the load balancer 255 and/or load monitor 405 determines the load 440 using a plurality of user selected metrics 430 weighted by user designated weights 435. In yet another embodiment, the load balancer 255 and/or load monitor 405 determines the load using a user selected metric 430 and user identified weight 435 and a load balancer established metric 410 and a load balancer established weight 435. In further embodiments, the load balancer 255 determines the load 440 by summing a weighted load for each metric (user and/or appliance) used for the service 270.

For the embodiment of multiple monitors 405A-405N per service 270, the load balancer 255 may determine the load for the service by assigning a weight to each monitor and computing weighted load across all the monitors 405. In other embodiments, the load balancer 255 and/or load monitor 405 determines a load for a service 270 at a predetermined frequency, such as every 1 msec. or every 1 sec.

In some embodiments, a load monitor 405 determines that a metric for a service 270 has reached or exceed a threshold 437. In other embodiments, a load monitor 405 determines that a metric for a service 270 is within a threshold 437. In one embodiment, the load monitor 405 uses a load balancer established or provided threshold for a metric. In another embodiment, the load monitor 405 user a user specified or configured threshold 437.

At step 470, the load balancer 255 receives a request from a client to access a service. In one embodiment, a virtual server or vServer 275 intercepts or otherwise receives a request from the client. In some embodiments, the virtual server 275 transparently intercepts the client's request to a service 270 or server 106. In other embodiments, a client 102 transmits the request to the vServer 275. In another embodiment, the vServer 275 determines from the request that the request is for one or more services under management by the load balancer 255. In one embodiment, the vServer 275 intercepts or receives the request via a SSL VPN connection between the client and the load balancer 255.

At step 475, the load balancer 255 determines which of the services to direct the client request based on determination of the load 440 for each service 270. In one embodiment, the vServer 275 directs the request responsive to one or more load monitors 405. In some embodiments, a vServer 275 directs, forwards or otherwise transmits the request to a service 270 with the least or smallest load. In one embodiment, the vServer 275 directs, forwards or otherwise transmits the request to a service with one of the lower determined loads. In some embodiments, the vServer 275 directs, forwards or otherwise transmits the request to the service previously handling requests from the client 102. In one embodiment, the vServer 275 transmits the request to the previously used service if the load of the service is within a predetermined threshold. In some embodiments, the vServer 275 transmits the request to the first available service in a list with a determined load within a predetermined threshold.

In another embodiment, a vServer 275 directs, forwards or otherwise transmits the request to a service 270 using a round robin technique, or weighted round robin. In yet another embodiment, the vServer 275 directs the request to a service based on one or more metrics, such as appliance collected metrics 410 or device provided metrics 420. For example, in some embodiments, the vServer 275 directs the request to a service based on one or more of the following: least response or round trip time, least number of connections, least number of packets, and least bandwidth. In yet other embodiments, the vServer 275 directs the request to a service based on one or more device provided metrics 430, such as CPU, memory and disk resource usage. In another example, the vServer 275 directs the request to a service based on service resource usage on the server, such as system resource usage by an application or session of the application.

In some embodiments, a vServer 275 may not direct a request to a service 270 in which a metric for the service 270 has exceeded a threshold 437, such as a user configured threshold 437. In other embodiments, a vServer 275 may not direct to a request to a service 270 if more than one threshold 437 of the metrics for the service has been exceeded. In yet another embodiment, a vServer 275 may direct a request to a service 270 if a metric threshold 437 has been reached or exceeded. For example, if one metric threshold 437 of a plurality of thresholds 437 has been exceeded, then the vServer 275 may still direct the request to the service if the other metric thresholds have not been reached.

In still other embodiments, the load balancer 255 may determine from load monitoring that a metric of a first vServer 275A has reached a threshold 437. In response to the determination, the load balancer 255 may spillover management of the services 270A-270N to a second virtual server, or vServer 275B. In one embodiment, the second virtual server 275B may be a backup server. In some embodiments, the second virtual server 275B is established in response to detecting the first virtual server 275A has reached one or more thresholds. In another embodiment, the second virtual server 275B may be established and running on the load balancer 255.

At step 480, the load balancer 255 transmits the client request to the service determined by the appliance at 475. In one embodiment, the load balancer 255 transmits the client request in a manner transparent to the service 270 such that the request appears to have been sent from the client instead of the load balancer 255. For example, the load balancer 255 may act as a transparent or intercepting proxy for the client 102. In other embodiments, the load balancer 255 acts as a non-transparent proxy and transmits the request to the service on the client's behalf. In some embodiment, the vServer 275 transmits the request to a service 270. In other embodiments, a backup vServer 275 transmits the request to the service. In yet other embodiments, a second vServer 275 transmits the request to the service.

C. Global Server Load Balancing Among Devices

Figure 3A:
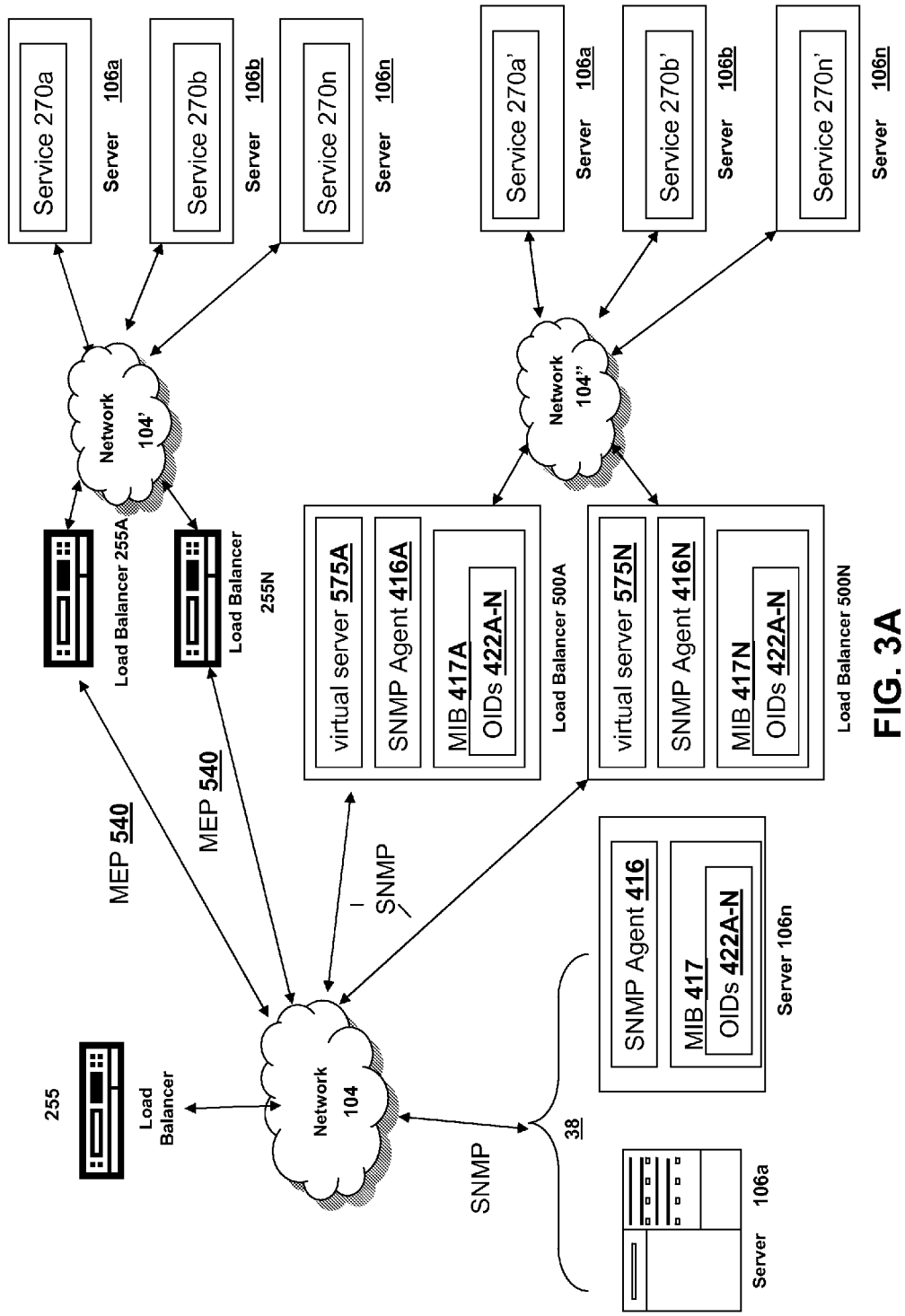
FIG. 3A is a block diagram of an embodiment of a network environment for performing global server load balancing among devices.
Figure 3B:
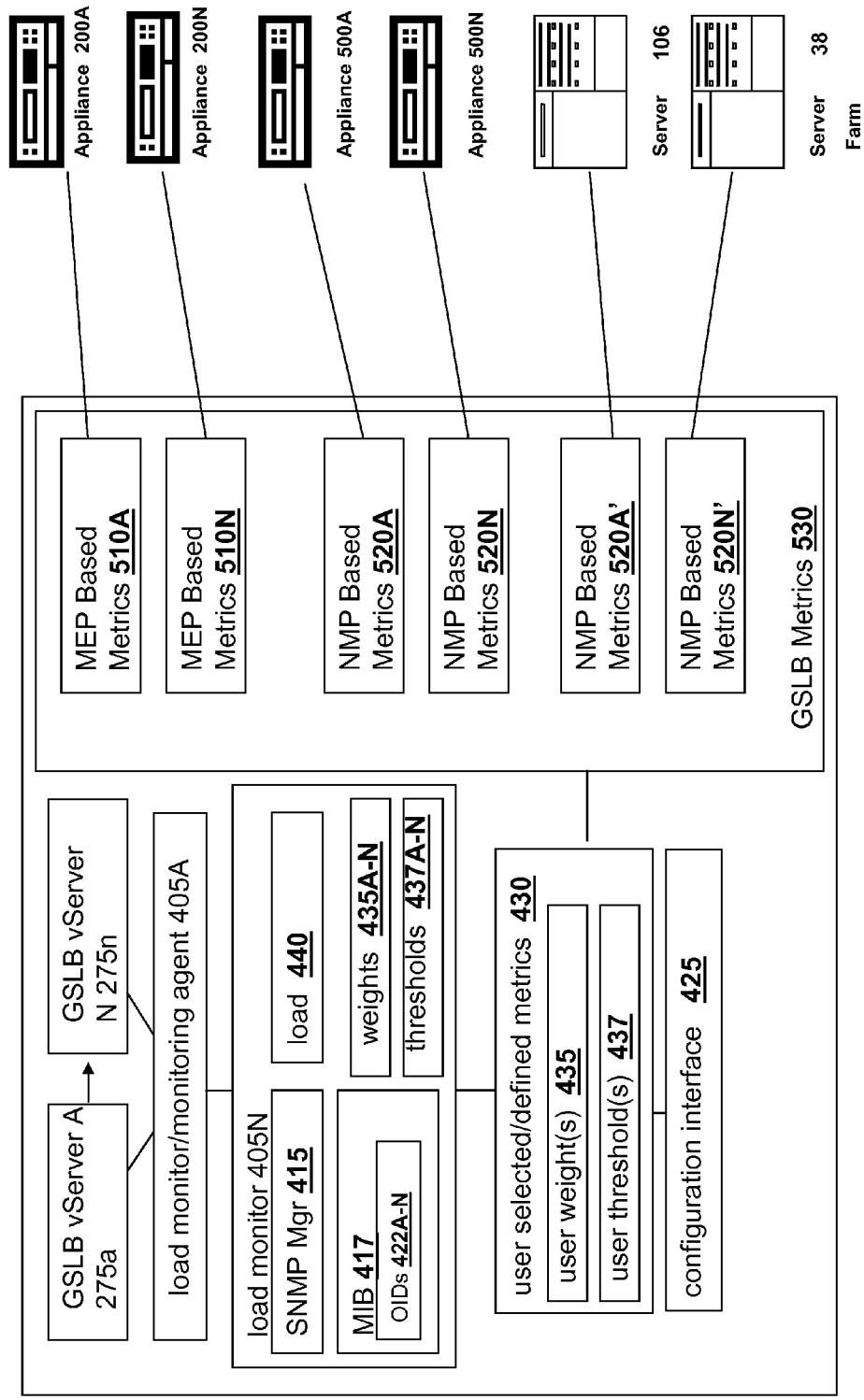
FIG. 3B is a block diagram of an embodiment of a system for performing load balancing among devices.
Figure 3C:
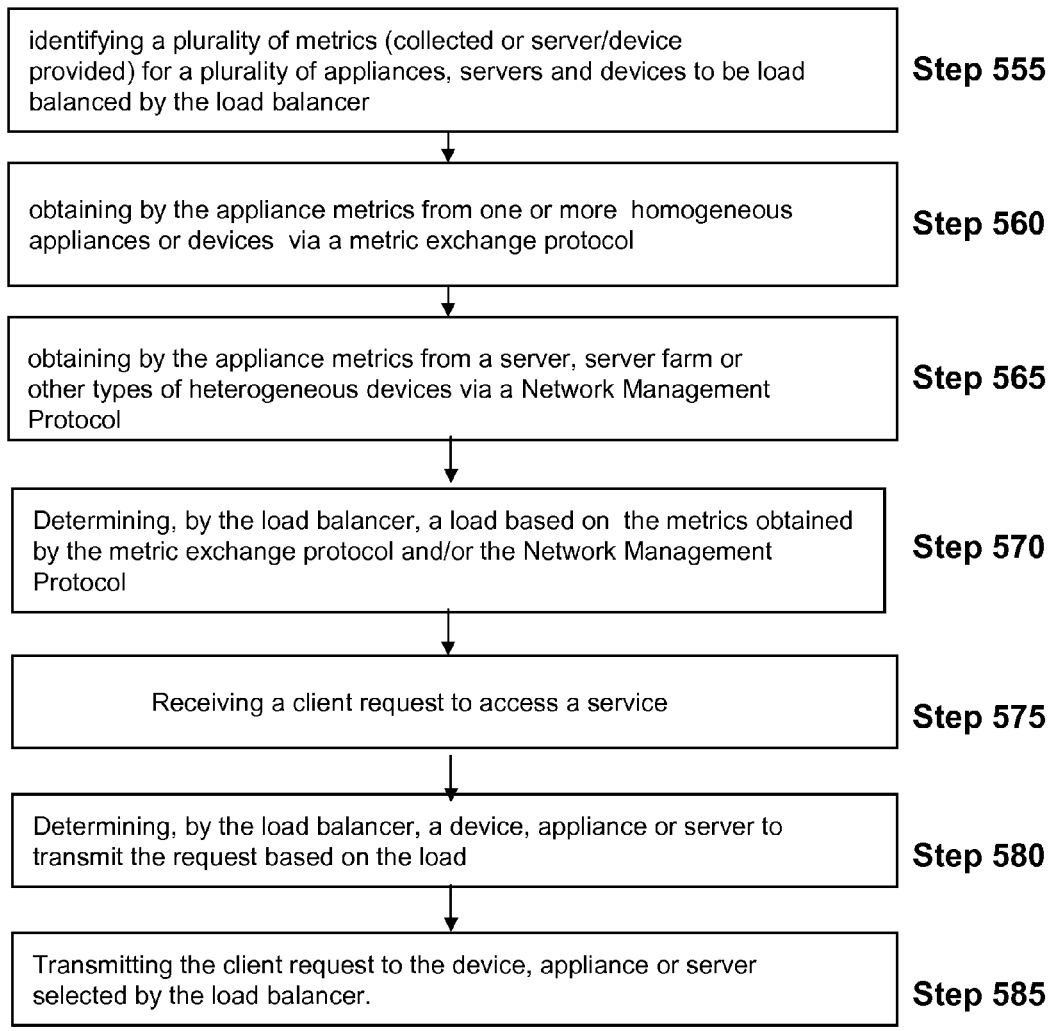
FIG. 3C is a flow diagram of an embodiment of steps of a method for Global Server Load Balancing among devices.

Referring now to FIGS. 3A-3C, systems and methods for load balancing a plurality of devices are depicted. The load balancer 255 described herein may be deployed to load balance a plurality of services and load balancing devices. A first load balancer 255 may communicate with a second load balancer 255A of the same type via a predetermined metric exchange protocol (MEP). The first load balancer 255 obtains via the MEP protocol metrics to use for determining a load for the second load balancer 255A. Other devices of a different type than the first load balancer 255 may be deployed in the network to perform local load balancing, such as for a server farm. These devices may not communicate via the MEP protocol of the first load balancer 255. Instead, these other device may provide metrics via a network management protocol, such as a Simple Network Management Protocol (SNMP). Using the techniques described in conjunction with FIGS. 2A and 2B, the first load balancer 255 obtains metrics from these heterogeneous devices via the network management protocol. With metrics obtains via the MEP protocol from devices of the same type and metrics obtained via a network management protocol from device of a different type, the load balancer 255 may uses these combined metrics to determine a load across these heterogeneous devices and to direct request to one of the devices based on the load.

Referring now to FIG. 3A, an example embodiment of a network environment for load balancing heterogeneous devices, including servers and local or other load balancing devices, is depicted. In brief overview, a network environment includes a plurality of different types of load balancing devices and servers. The load balancer 255 is configured as a global load balancing device to load balance the plurality of load balancing devices and servers. Each of the load balancing devices may perform local load balancing to one or more services 270A-270N. For example, a first set of load balancer 255A-255N of the same type may perform local load balancing of services or servers on a first network 104. These load balancers 255A-255B may be of the same type of the global load balancer 255. Or in some cases, local load balancers 255A-255N are designed and constructed to communicate metrics and other information via a metric exchange protocol 540. A second type of load balancer 500A-500N may perform local load balancing for one or more services 270A'-270N' on a second network 104'. These load balancers 500A-500N may be of a different type than the first type of load balancers 255A-255N and/or the global load balancer 255. The load balancer 500A-500N may operate or execute one or more virtual servers or vServers 275A-275N. Load balancer 500A-

500N may not be designed to communicate via the MEP protocol 540 of load balancer 255A-255N. Instead these load balancers 500A-500N may provide metrics via a network management protocol, such as SNMP. The global load balancer 255 may also perform load balancing for one or more services or servers, such as a server farm 38. Each of the servers or services may be of a different type, such as an HTTP service and an FTP service.

In view of FIG. 3A, the plurality of load balancers, servers, and services may be deployed in a hierarchical fashion. The first load balancer 255 may be at the top of the hierarchy to manage a plurality of other load balancers 255A-255N, 500A-500N and servers. In one case, the load balancer 255 manages one or more servers 106 or service 270A-270N directly. In another case, the load balancer 255 manages one or more appliances 255A-255N, 500A-500N, which in turn manages one or more servers 106 or services 270A-270N. A load balancer managed by the first load balancer 255 may manage a second load balancer, which in turns manages one or more services or servers.

By way of example in view of various load balancing products, the global load balancer 255 may be any of the product embodiments referred to as NetScaler manufactured by Citrix Systems, Inc. The load balancer 255A-255N may also be a NetScaler device configured to perform local load balancing of one or more services 270A-270N. As the load balancer 255A-255N are of the same type as the global load balancer 255, these devices are designed and constructed to communicate via a predetermine protocol or and/or communication model referred to as metric exchange protocol. The load balancer 255A-255N may be configured to provide metric information at a predetermined frequency to load balancer 255. One or more of the load balancers 500A-500N may comprise another type of load balancing device, such as a BigIP load balancing device manufactured by F5 Networks, Inc. Another one or more of the appliances 500A-500N may comprise a different type of load balancing device, such as the AppDirector appliance manufactured by Radware, LTD. In some cases, one or more of the load balancers 500A-500N may comprise a Cisco load balancing device. In other cases, one or more of the appliances 500A-500N may comprise a Nortel load balancing device. Any one or more of these load balancers 500A-500N may not be designed or constructed to communicate with load balancer 255 via the MEP protocol 540.

Instead of using MEP 540, each of these different load balancers 500A-500N may provide metric information via a network management protocol, such as SNMP. As illustrated in FIG. 3A, these load balancers 500 may include an agent 416 for providing object identifiers 422A-422N via an MIB 417. Further to this example embodiment and as discussed in conjunction with FIGS. 2A and 2B, the load balancer 255 using a manager/agent communication model may query any of these load balancers 500A-500N via a network management protocol to identify, collect and monitor objects identified via the MIB 417. In some cases, the load balancer 255 may use SNMP to communicate with one or more load balancers 500A-500N. In other cases, the load balancer 255 may use another type of network management protocol to communication another one or more of the load balancers 500A-500N. In still another case, the load balancer 255 may use a third type of network manager protocol to communicate with a further set of one or more load balancers 500A-500N.

Load balancers 255A-255N may be considered homogenous or the same type of appliance or device as load balancer 255. In one embodiment, the load balancers 255A-255N are of the same product family as the load balancer 255. In another embodiment, the load balancer 255A-255N is a version of the same device of the load balancer 255. In one case, the load balancers 255 and 255A-255N are manufactured by the same company. In some embodiments, the load balancers 255A-255N and load balancer 255 are configured, designed and constructed to communicating using a predetermined protocol and/or communication model. In one embodiment, the load balancers 255A-255N and load balancer 255 are configured, designed and constructed to use a proprietary or custom protocol and/or communication model.

Load balancers 255A-255N may be considered heterogenous or a different type of appliance or device as load balancer 255. In one embodiment, the load balancers 500A-500N are manufactured by a different company than load balancer 255. In some embodiments, the load balancers 500A-500N and load balancer 255 are not specifically designed to communicate using a predetermined protocol and/or communication model. In one embodiment, the load balancers 500A-500N and load balancer 255 are not configured, designed and constructed to use a proprietary or custom protocol and/or communication model. In some cases, the load balancers 500A-500N use a network management protocol instead of using a proprietary protocol for providing metrics to other devices, applications or services.

Referring now to FIG. 3B, an embodiment of the load balancer 255 for identifying, collecting and monitoring metrics obtained from heterogeneous network devices and servers with a plurality of protocols is depicted. The load balancer 255 may have one or more virtual servers 275A-275N configured, constructed or designed to provide load balancing of the plurality of devices over one or more networks 104, 104', 104'. The load balancer 255 may use one or more load monitors 405A-405N to monitor the load of each of the heterogeneous devices. In one embodiment, the load balancer 255 monitors the load of appliances 200A-200N. The load balancer 255 and/or load monitor 405 uses the MEP protocol 540 to obtain metrics from one or more of the load balancers 255A-255N. In another embodiment, the load balancer 255 monitors the load of load balancers 500A-500N. In other embodiments, the load balancer 255 monitors the load of one or more servers 106. In still another embodiment, the load balancer 255 monitors the load among servers in a server farm 38. The load balancer 255 may use one or more network management protocols to obtain metrics from server 106, server farm 38, and load balancers 500A-500N.

The load balancer 255 collects metrics via the MEP protocol 540 and network management protocols from a wide variety of heterogeneous devices, such as load balancers 500A-500N and servers 106, and homogenous devices 200A-220N. The load balancer 255 stores the metrics in a GSLB (Global Server Load Balancing) or global metrics table 530 comprising any type and form of data storage element, such as a file, database, object or data structure in memory and/or on disk. The vServers 275 and/or load monitors 405 use one or more of the metrics from the GSLB metrics 530 to provide global load balancing of servers, server farms, virtual servers, and load balancing devices.

The load balancer 255 may collect and monitor metrics obtained via a MEP protocol 540 from one or more load balancer 255A-255N and store them in a MEP based metrics table 510A-510N. In one embodiment, the load balancer 255 uses a first type or first version of a MEP protocol 540 to obtain metrics from a first load balancer 255A and stores the metrics in a first table 510A. In another embodiment, the load balancer 255 uses a second type or second version of a MEP protocol 540' to obtain metrics from a second load balancer 255N and stores the metrics in a second table 510N.

The load balancer 255 may collect and monitor metrics from load balancers 500A-500N using any type and form of network management protocol (NMP) and store the metrics in a NMP based metrics table 520A-520N. In one embodiment, the load balancer 255 uses a SNMP protocol and communication model to obtains metrics from a second type of load balancer 500A and stores the metrics in a NMP based metric table 520A. In some embodiments, the load balancer 255 uses a second type of network management protocol, such as CIMP, to obtain from a second or third type of load balancer 500N and stores the metrics in a NMP based metric table 520N. In some embodiments, load balancer 500A is a different type of device than load balancer 500N but both devices support the same network management protocol for providing metrics.

The load balancer 255 may also collect and monitor metrics from a server 106 and/or server arm 38 using any type and form of network management protocol (NMP) and store the metrics in a NMP based metrics table 520A'-520N'. In one embodiment, the load balancer 255 uses the same network management protocol, such as SNMP, for obtaining metrics from a server 106 as used for obtaining metrics from one of the appliances 500A-500N. In another embodiments, the load balancer 255 uses a different type of network management protocol for obtaining metrics from the server than is used by the load balancer 255 for obtaining metrics from an load balancer 500.

The load balancer 255 may store metrics for the GSLB metrics 520 in a separate table for each device. For example, the load balancer 255 may store metrics for a first load balancer 255A in a first metrics table 510A, and metrics from a second load balancer 255B in a second metrics table 520A. The load balancer 255 may store metrics from a server 106 in a server metrics tables 520A'. In another embodiment, the load balancer 255 stores metrics from a server farm 38 to a metrics table 520N' for the server farm.

The load balancer 255 may store metrics for the GSLB metrics 520 in a separate table for each type of protocol. For example, the load balancer 255 may store all MEP based metrics from a plurality of load balancer 255A-255N in a first metrics table. In some embodiments, the load balancer 255 stores a first type or version of MEP protocol based metrics in a first table 510A and a second type or version of an MEP protocol in a second table 510N. The load balancer 255 may store all SNMP based metrics from one or more load balancers 500A-500N in a second metrics table. In another example, the load balancer 255 may store metrics from a second type of network management protocol from one or more load balancers 500A-500N to a third metrics table.

The GSLB metrics 530 may comprise any type and form of data, statistics, status or information related to or associated with the operational and/or performance characteristics of the load balancer 255, 500, a server 106 or server farm 38. The global metrics 530 may comprise any type and form of data, statistics, status or information related to the network of the load balancer 255, 500, and/or server 106 or server farm 38. The global metrics 530 may comprise any type and form of data, statistics, status or information related to the services 270A-270N load balanced by the load balancer 255A-255N, 500A-500N. In some embodiments, the global metrics 530 comprises operational and/or performance data on any client 102 and/or server 106 connected to the load balancer 255A-255N, 500A-500N. In one embodiment, the load balancer 255A-255N, 500A-500N determines operational and/or performance information about any client 102 or server 106 it is connected to or servicing, and creates metrics on these clients 102 and/or server 106. In this embodiment, the load balancer 255A-255N, 500A-500N may provide these metrics to the global load balancer 255.

In some embodiments, the operational and/or performance characteristic provides a metrics includes information on any of the following for an appliance or server 1) load; 2) numbers and types of connections, 3) resource usage, 4) resource availability, 5) number of requests outstanding, 6) number of requests transmitted, 7) number of clients servicing, 8) response time information, including average and historical response times, 9) errors, status, performance or bandwidth of a connection, and 10) number of sessions, and states or status thereof. In another embodiment, the metrics 530 includes information on any IP or network layer information of the load balancer 255A-255N, 500A-500N, or the connections of the load balancer 255A-255N, 500A-500N, or of the clients and/or servers serviced by the load balancer 255A-255N, 500A-500N. For example, the information provided via metrics 530 may include a routing table of the load balancer 255A-255N, 500A-500N for performing network address translation, such as for an SSL VPN connection.

Via the configuration interface 425, a user may select one or more metrics 430 from the global metrics 530 to use for load monitoring and determining the load 440. The load balancer 255 may receive information identifying a user selection of one or more metrics from the global metrics 530. The load balancer 255 may receive a user selection of one or more MEP based metrics 510 of a first type of appliance. The load balancer 255 may receive a user selection of one or more NMP based metrics 520 of a second type of appliance. The load balancer 255 may also receive a user selection of one or more NMP based metrics 520' for any server or server farm. The user may select any combination of metrics 430 from the global metrics 530 to configure the load balancer 255 to perform load balancing of heterogeneous devices according to the user selected metrics.

In one embodiment, the load balancer 255 uses load balancer established metrics in combination with any one or more of the user selected metrics 430 for load balancing. For example, the load balancer 255 may collect and monitor the number of connections, response time, bandwidth and numbers of packets for any load balancer 255, 500 or server 106 and use these metrics with any user selected metrics for load balancing. Via the configuration interface 425 and as also discussed in conjunction with FIGS. 2A and 2B, the load balancer 255 may receive information from the user identifying, designating or establishing weights 435 and/or thresholds 437 for any load balancer established metrics and/or user selected metrics.

Referring now to FIG. 3C, an embodiment of steps of a method 550 for performing global load balancing among heterogeneous devices is depicted. In brief overview, at step 555, the load balancer 255 identifies a plurality of metrics from heterogeneous devices to use for load balancing by the load balancer 255. At step 560, the load balancer 255 obtains metrics from one or more homogenous load balancers 255A-25N or load balancers of the same type as the first load balancer 255. At step 565, the load balancer 255 obtains metrics from heterogeneous devices, such as load balancers 500A-500N and/or servers 106, via a network management protocol, such as SNMP. At step 570, the load balancer 255 determines a load of one or more of the plurality of appliances, servers, and/or service managed by the load balancer 255 based on the metrics collects at step 560 and step 565. At step 575, the load balancer 255 receives a client request to access a service. At step 580, the load balancer 255 determines based on the load one of the load balancer 255A-255N, 500A-500N or one of the servers to which to direct the client request. At step 580, the load balancer 255 transmits the request to the device, appliance or service selected in accordance with the determined load.

In further details, at step 555, the load balancer 255 identifies metrics to collect and monitor for load balancing one or more load balancers 255A-255N, 500A-500N, servers 106 or services 270A-270N. In one embodiment, the load balancer 255 provides or identifies one or more appliance collected metrics 410 as described in conjunction with FIGS. 2A and 2B. For example, a table 410 may identify metrics collected by the load balancer 255. In another embodiment, the load balancer 255 provides one or more predetermined tables of appliance provided metrics 510 or 520, such as for an appliance of Citrix, F5, Cisco, or Radware. In other embodiments, the load balancer 255 identifies one or more metrics to collect via a network management protocol in an object or variable database, such as an MIB 417 for SNMP. In one embodiment, the load balancer 255 provides a preconfigured or preinstalled MIB 417 for a predetermined load balancer 255A-255N, 500A-500N, server 106 or service 270.

In some embodiments, the load balancer 255 queries a load balancer 255A-255N, 500A-500N, server 106 or service 270 to determine available metrics to collect and/or monitor. For example, in one embodiment, the load balancer 255 queries an appliance, server or service for available object identifiers 422A-422N. In another embodiment, the load balancer 255 uses a network management protocol, such as SNMP, to query for the identification of objects in a MIB 417. In yet another embodiment, a user via the configuration interface 425 identifies one or more object identifiers 422A-422N to collect and/or monitor from a load balancer 255A-255N, 500A-500N, server 106 or service 270. In some embodiments, the user via the configuration interface 425 identifies one or more of the global metric 530 to collect and/or monitor from any one of the heterogeneous device under management.

At step 560, the load balancer 255 collects and/or monitors metrics 510A-510N from one or more load balancers 255A-255N via a MEP protocol 540. In some embodiments, the load balancers 255A-255N are of the same type or homogenous with the load balancer 255. In one embodiment, the load balancer 255 collects and/or monitors metrics 510 established, determined or otherwise selected by the load balancer 255. In another embodiment, the load balancer 255 collects and/or monitors metrics 510 established, determined or otherwise selected by a user. In some embodiments, the load balancer 255 uses a first type or version of the MEP protocol 540 to collect metrics from a first load balancer 255A and a second type or version of the MEP protocol 540' to collect metrics from a second load balancer 255N.

One or more load monitors or monitoring agents 405A-405N of the load balancer 255 may be configured, constructed or implemented to identify, collect and/or monitor metrics via MEP protocol 540 from one or more load balancer 255A-255N. A first load monitor 405A may collect and monitor metric values from a first load balancer 255 A. A second load monitor 405N may collect and monitor metric values from a second load balancer 255 N. A third load monitor 405 may collect and monitor metric values from the first and second load balancer 255A-255N. A load monitor 405A-405N may collect and/or monitor metrics on any type of schedule or predetermined frequency. In some embodiments, the load monitor 405 collects metrics responsive to the detection of an event.

At step 565, the load balancer 255 collects and/or monitors metrics 520A-520N' from one or more load balancers 500A-500N, servers or a server farm any type and form of network management protocol. In some embodiments, the load balancers 500A-500N are a different type or heterogeneous with the load balancer 255. In other embodiments, one or more of the load balancers 500A-500N are of a different type or heterogeneous with one or more of the other load balancers 500A-500N. In one embodiment, the load balancer 255 collects and/or monitors metrics 520 established, determined or otherwise selected by the load balancer 255. In another embodiment, the load balancer 255 collects and/or monitors metrics 520 established, determined or otherwise selected by a user. In some embodiments, the load balancer 255 uses a first type or version of a network management protocol, such as SNMP, to collect metrics from a first load balancer 500A and a second type or version of a network management protocol, SNMP or CIMS, to collect metrics from a second load balancer 500N.

One or more load monitors or monitoring agents 405A-405N of the load balancer 255 may be configured, constructed or implemented to identify, collect and/or monitor metrics via a network management protocol from one or more load balancers 500A-500N. A first load monitor 405A may collect and monitor metric values from a first load balancer 500A. A second load monitor 405N may collect and monitor metric values from a second load balancer 500N. A third load monitor 405 may collect and monitor metric values from a server 106 or server farm 38. In other embodiments, multiple monitors 405A-405N may collect and/or monitor metrics from a plurality of load balancers 500A-500N and/or servers 106. A load monitor 405A-405N may collect and/or monitor any of the metrics 520A-520N on any type of schedule or predetermined frequency. In some embodiments, the load monitor 405 collects metrics 520A-520N' responsive to the detection of an event.

At step 570, the load balancer 255 determines a load for each of the one or more devices 255A-255N, 500A-500N, servers, server farm or services. In some embodiments, a vServer 275 determines the load 440 for each service 270 via metric information collected and monitored by a load monitor 405. In another embodiment, the load monitor 405 determines the load 440 for an appliance, server or service being monitored.

The load balancer 255, vServer 275 and/or load monitor 405 may determine the load 440 using a user selected metric 430 weighted by a user designated weight 435. In some embodiments, the load balancer 255 and/or load monitor 405 determines the load 440 using a plurality of user selected metrics 430 weighted by user designated weights 435. In yet another embodiment, the load balancer 255 and/or load monitor 405 determines the load using a user selected metric 430 and user identified weight 435 and a load balancer established metric 410 and a load balancer established weight 435. In further embodiments, the load balancer 255 determines the load 440 by summing a weighted load for each metric. For the embodiment of multiple monitors 405A-405N per service 270, the load balancer 255 may determine the load for an appliance, server or service by assigning a weight to each monitor and computing weighted load across all the monitors 405. In yet another embodiment, the load balancer 255 may determine the load for an appliance, server or service by assigning a weight to each of the appliance, service or service.

In some embodiments, a load monitor 405 determines that a metric 530 for an appliance, server or service has reached or exceeded a threshold 437. In other embodiments, a load monitor 405 determines that a metric 530 for an appliance, server or service is within a threshold 437. In one embodiment, the load monitor 405 uses an appliance established or provided threshold for a metric 530. In another embodiment, the load monitor 405 uses a user specified or configured threshold 437.

At step 575, the load balancer 255 receives a request from a client to access a service. In one embodiment, a virtual server or vServer 275 of the load balancer 255 intercepts or otherwise receives a request from the client. In some embodiments, the virtual server 275 transparently intercepts the client's request to a service 270 or server 106. In other embodiments, a client 102 transmits the request to the vServer 275. In another embodiment, the vServer 275 determines from the request that the request is for one or more services under management by the load balancer 255. In one embodiment, the vServer 275 intercepts or receives the request via a SSL VPN connection between the client and the load balancer 255.

At step 580, the load balancer 255 determines which of the load balancers 255A-255N, servers 106 or services 270A-270N to direct the client request based on determination of the load 440 for each of the load balancers 255A-255N, servers 106 or services 270A-270N. In one embodiment, the vServer 275 directs the request responsive to one or more load monitors 405. In some embodiments, a vServer 275 directs, forwards or otherwise transmits the request to an load balancer 255A-255N, 500A-500N, server or service with the least or smallest load. In one embodiment, the vServer 275 directs, forwards or otherwise transmits the request to a load balancer 255A-255N, 500A-500N, server or service with one of the lower determined loads. In some embodiments, the vServer 275 directs, forwards or otherwise transmits the request to the s a load balancer 255A-255N, 500A-500N, server or service previously handling requests from the client 102. In one embodiment, the vServer 275 transmits the request to the previously used an load balancer 255A-255N, 500A-500N, server or service if the load for the load balancer 255A-255N, 500A-500N, server or service is within a predetermined threshold. In some embodiments, the vServer 275 transmits the request to the first available a load balancer 255A-255N, 500A-500N, server or service in a list with a determined load within a predetermined threshold.

In another embodiment, a vServer 275 directs, forwards or otherwise transmits the request to a load balancer 255A-255N, 500A-500N, server or service using a round robin technique, or weighted round robin. In yet another embodiment, the vServer 275 directs the request to a load balancer 255A-255N, 500A-500N, server or service based on one or more metrics, such as appliance collected metrics 410 or device provided metrics 420. For example, in some embodiments, the vServer 275 directs the request to a load balancer 255A-255N, 500A-500N, server or service based on one or more of the following: least response or round trip time, least number of connections, least number of packets, and least used bandwidth. In yet other embodiments, the vServer 275 directs the request to a load balancer 255A-255N, 500A-500N, server or service based on one or more device provided metrics 530, such as CPU, memory and disk resource usage. In another example, the vServer 275 directs the request to a load balancer 255A-255N, 500A-500N, server or service based on resource usage on or of a load balancer 255A-255N, 500A-500N, server or service.

In some embodiments, a vServer 275 may not direct a request to a load balancer 255A-255N, 500A-500N, server or service in which a metric for the service 270 has exceeded a threshold 437, such as a user configured threshold 437. In other embodiments, a vServer 275 may not direct to a request to a load balancer 255A-255N, 500A-500N, server or service if more than one threshold 437 of the metrics 530 for the load balancer 255A-255N, 500A-500N, server or service has been exceeded. In yet another embodiment, a vServer 275 may direct a request to a load balancer 255A-255N, 500A-500N, server or service even if a metric threshold 437 has been reached or exceeded. For example, if one metric threshold 437 of a plurality of thresholds 437 has been exceeded, then the vServer 275 may still direct the request to the load balancer 255A-255N, 500A-500N, server or service if the other metric thresholds have not been reached.

In still other embodiments, the load balancer 255 may determine from load monitoring that a metric of a first GSLB vServer 275A has reached a threshold 437. In response to the determination, the load balancer 255 may spillover management of the load balancer 255A-255N, 500A-500N, servers or services to a second GSLB virtual server, or vServer 275B. In one embodiment, the second virtual server 275B may be a backup GSLB server. In some embodiments, the second GSLB virtual server 275B is established in response to detecting the first GSLB virtual server 275A has reached one or more thresholds. In another embodiment, the second GSLB virtual server 275B may be established and running on the load balancer 255.

At step 580, the load balancer 255 transmits the client request to the load balancer 255A-255N, 500A-500N, server or service identified by the load balancer 255 at 585. In one embodiment, the load balancer 255 transmits the client request in a manner transparent to the load balancer 255A-255N, 500A-500N, server or service such that the request appears to have been sent from the client instead of the load balancer 255. For example, the load balancer 255 may act as a transparent or intercepting proxy for the client 102. In other embodiments, the load balancer 255 acts as a non-transparent proxy and transmits the request to the load balancer 255A-255N, 500A-500N, server or service on the client's behalf. In some embodiment, the vServer 275 transmits the request to the load balancer 255A-255N, 500A-500N, server or service. In other embodiments, a backup vServer 275 transmits the request to the load balancer 255A-255N, 500A-500N, server or service. In yet other embodiments, a second vServer 275 transmits the request to the load balancer 255A-255N, 500A-500N, server or service Although the systems and methods of FIGS. 3A-3C are generally discussed in the context of global server load balancing, these systems and methods may be used for local load balancing. The load balancer 255 may use metrics obtained from heterogeneous devices, servers, or services using a plurality of protocols to load balance one or more services or servers. Using the techniques described herein, the load balancer 255 is configurable and flexible to obtain metrics from any network resource—system, sub-system, application, service, device, etc—using either a metric exchange protocol supported by the appliance and/or a more general network management protocol supported by the network resource. Additionally, the load balancer 255 is configurable to allow users to select any combination of available metrics from these heterogeneous network resources to perform load monitoring and load balancing of one or more services.

D. Performing Maintenance on Computers in a Load Balanced Environment

Embodiments of the methods and systems described herein can provide for automation of a maintenance event rollout to a group of load balanced computers. These methods and systems may be suitable for various load balanced environments, including but not limited to those described above in connection with FIGS. 1E through 3C. In certain embodiments, the methods for performing maintenance on computers can limit the risk that a load balanced group of computers will become under-provisioned at any point in time. This may be achieved by employing opportunistic maintenance, for example, maintenance performed when the load on a computer is low and/or when spare capacity from other computers is available, and maintenance performed on one or more select computers at a time.

Figure 4A:
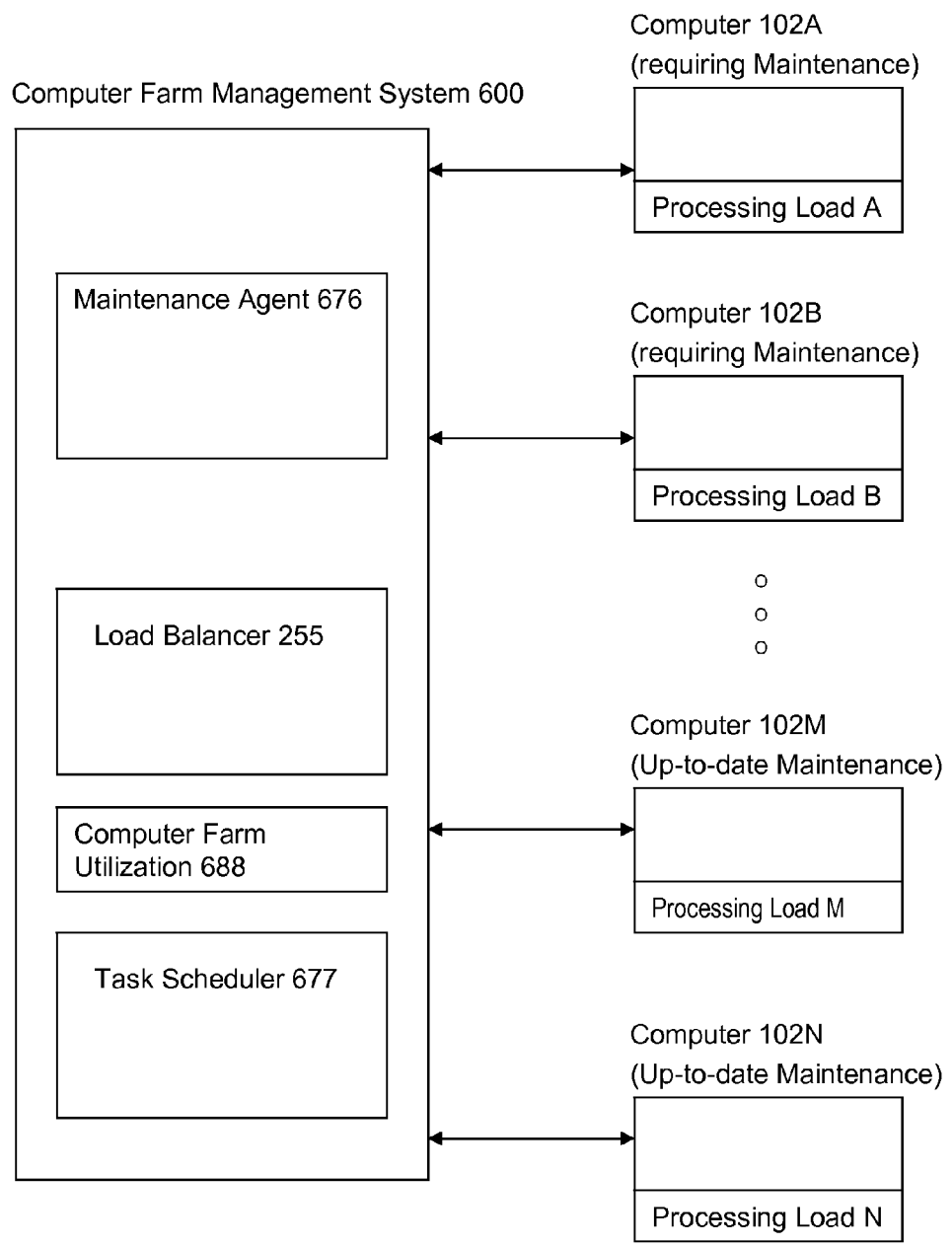
FIG. 4A is a block diagram of an embodiment of a system for performing maintenance on computers in a load balanced environment.

Illustrated in FIG. 4A is one embodiment of a system for performing maintenance on computers in a load balanced environment. In brief overview, the system environment includes a computer farm comprising a plurality of computers 102A-N and a computer farm management system 600. The management system 600 may comprise one or more servers, appliances or any other type of computing devices over a network. In an illustrative embodiment, the management system may include one or more load balancers 255 and maintenance agents 676. A load balancer 255 of this system may comprise features from embodiments of load balancers 255 described above in connection with FIGS. 2A-2B and 3A-3C. For example, a virtual server executing on an appliance may be configured to provide load balancing functionality for managing a plurality of computers.

In some embodiments, the system includes at least one maintenance agent 676. The maintenance agent 676 may be constructed and/or configured for updating one or more computers of the computer farm. The maintenance agent 676 may update a computer 102 by way of transmitting a patch, disk image, configuration or installation file to a computer. The computer may apply or execute the update based on instructions from the maintenance agent 676. In some embodiments, an update file may self-install upon receipt at the computer 102. In some embodiments, the maintenance agent 676 may communicate with an agent on a computer to convey and/or install an update. A maintenance agent 676 may also transmit an agent to a computer to perform an update on the computer. A maintenance agent 676 may, in some embodiments, be a mobile agent that roams from computer to computer to propagate an update.

In certain embodiments, the maintenance agent includes a coordinating service that monitors one or more computers and tracks updates available or mandatory for these computers. The maintenance agent 676 may communicate with one or more computers 102A-N using any proprietary, custom or standard protocol, for example SNMP. In one embodiment, the maintenance agent 676 communicates with a computer via a control connection with the computer, which may be temporary, low-bandwidth, and/or secured where appropriate.

The maintenance agent 676 may include hardware or any combination of hardware and software configured to provide the functionalities described herein. For example, the maintenance agent 676 may include a program, application, service, daemon, sub-routine, logic, or other instructions executing on hardware, for monitoring and/or implementing updates to a computer. The maintenance agent 676 may include one or more components residing or executing on a plurality of computing devices. For example, the maintenance agent 676 may have a management module residing on a network appliance and a plug-in or client-side interface residing on a computer that requires maintenance from time to time. In certain embodiments, the maintenance agent 676 may be a component of a load balancer 255, or share some of the same resources (e.g., hardware) as a load balancer 255. In one illustrative embodiment, the maintenance agent 676 is a service provided by a virtual machine executing on a computing device.

The maintenance agent 676 may perform any type or form of maintenance update to a computer, for example, hardware, software or otherwise. A maintenance agent 676 may provide patches, hotfixes, upgrades to an operating system or software to a computer. A maintenance agent 676 may install or uninstall any type or form of software, patches, upgrades, etc, to a computer. For example, a maintenance agent 676 may determine that the virus description files of an anti-virus program is out-of-date. The maintenance agent 676 may search for, download and/or install an update to the virus description files. In certain embodiments, the maintenance agent 676 may scan for unauthorized installation or modification of programs and may uninstall, disable or quarantine these programs, or alert a user or administrator of these programs. Similarly, a maintenance agent 676 may detect data corruption or defective programs and may attempt to repair, isolate, uninstall, disable, or quarantine the affected programs or files, or alert a user or administrator of these occurrences.

A maintenance agent 676 may install disk images, including disk delta changes to a computer. For example, a maintenance agent 676 may update a software configuration of a computer by applying a disk delta file to an existing disk image (e.g., base image) of the computer. In some virtualization environments, for example, a maintenance agent 676 may perform maintenance by updating a base disk image of a computer for hosting or providing a virtualization environment. Such base image updates may reduce risk to maintenance failures in computers. The use of base image updates may further allow an administrator to revert or rollback to an earlier version of a base image if a problem is detected. In yet other embodiments, a maintenance agent 676 may update a computer with new or modified hibernation files, such as a hibernation file for quick boot-up to provide specific applications.

In one embodiment, a maintenance agent 676 may reprogram a field-programmable gate array (FPGA) or implement any other hardware changes to a computer. A maintenance agent 676 may, for example, be a robotic entity that replaces, repairs or upgrades parts of a computer. A maintenance agent 676 may further provide diagnostic, health and other scanning or monitoring services for one or more computers. A maintenance agent 676 may perform any other type of maintenance such as disk defragmentation, reclaim unused memory pages, perform a desktop clean-up, check for OS or program updates, remove temporary files, perform a virus/spyware/malware scan, perform disk or file backup, synchronize local directories and databases with central services, etc.

In some embodiments, the maintenance agent 676 may monitor and/or communicate with a computer via the load balancer 255, or an agent of the load balancer 255. For example, a collection or monitoring agent 405, 416 of a load balancer 255 may determine if a computer is due for maintenance, or provide information to the maintenance agent 676 that indicates if a computer is due for maintenance. In some embodiments, a computer may issue an alert to the maintenance agent 676 indicating that the computer requires maintenance and/or repair. In yet other embodiments, the maintenance agent 676 communicates directly with a computer to determine if the computer is due for maintenance. The maintenance agent 676 may receive information and/or instructions from any other source indicating that a computer is due for maintenance. For example, an administrator may indicate to the maintenance agent 676 that a group of computers is due for servicing. A central service may provide a patch or directive (emergency, routine or otherwise) to update a computer. Third-parties, such as software and hardware vendors, may communicate an update or a fix directly to a monitored computer, or to the maintenance agent 676 for distribution and/or installation.

Referring again to FIG. 4A, each of the computers 102 may be any embodiment of the computing device 100, computer 102, server 106, appliance 200, or any network device described above in connection with FIGS. 1A through 3C. The plurality of computers 102A-N may be clustered, grouped and/or managed as one or more computer farms or load balanced groups. Some of the computers may host or provide services that differ from some other computers, and may be grouped accordingly. In some embodiments, the plurality of computers 102A-N comprises homogenous devices. In other embodiments, the plurality of computers 102A-N comprises heterogeneous devices, such as those described above in connection with FIGS. 3A-3C.

Each of the computers 102 may host or provide one or more services, such as a web application, virtualized environment (such as a remote desktop session), database, virtual machines, etc. A load balancer 255 may receive a request for a service and may direct or assign the request to one or more of the computers, for example, as described above in connection with FIGS. 1D through 3C. Accordingly, a computer 102 may be processing zero, one or more requests at any one time. A processing load is associated with each computer based on the number and type of request(s) the computer 102 is processing. The processing load may be represented or determined by one or more metrics, such as the metrics discussed above in connection with FIGS. 2A through 3C.

When a computer is not processing any requests, the computer may be referred to as "idle". In some embodiments, some level of load may exist on a computer (e.g., from residual processes, overhead processes, or self-maintenance processes), even though the computer is not presently processing any requests assigned by a load balancer. In some of these embodiments, the computer may be identified as idle because it is not processing any load balancer assigned requests. In certain embodiments, when a computer is not running any critical processes, or that existing processes may be terminated, moved or saved for completion at a later time, such as without significant degradation or loss of service level, the computer may be referred to as idle. A computer is sometimes referred to as idle if its processing load is below a predetermined threshold, e.g., to account for overhead processes. A computer may be identified as idle if it is in one or the following modes or states: standby, hibernation, sleep, powered-down, low-power and inactive. In some embodiments, a computer may be identified as idle due to a lower processing load relative to another computer. A computer may, in some circumstances, be identified as idle when it is providing (non-critical) redundancy processing in parallel with another computer servicing the same request.

In some embodiments, a computer may be described as offline if the computer is in one of the following modes or states: standby, hibernation, sleep, powered-down, low-power, and inactive. An offline computer may sometimes be included in the pool of load balanced computers. In other embodiments, an offline computer may be excluded from the pool of load balanced computers. In yet another embodiment, an offline computer refers to a computer that does not belong to a load balanced group of computers. In some embodiments, the maintenance agent may select an offline computer for maintenance. Where an offline computer is to be removed from a pool of load balanced computers for maintenance, the load balancer may first determine if the removal may affect availability of a service, in accordance with the methods and systems discussed herein. In some cases, an offline computer may be made available for accepting requests in order to increase service availability.

The load balancer 255 may monitor the spare capacity or processing load of at least some of the plurality of computers 102A-N. In some embodiments, the load balancer may monitor or track the processing load or utilization 688 of the plurality of computers. These may be performed using any of the systems and methods described above in connection with FIGS. 2A-3C. The load balancer 255 may determine spare capacity based on the utilization 688 of the plurality of computers. In some embodiments, spare capacity may be determined as the number or fraction of load balanced computers available to receive a request. Spare capacity may be determined as the number of up-to-date computers available to receive a request. The utilization 688 of the plurality of computers may be determined based on the processing load and/or other metric(s) from the plurality of computers. Utilization 688 may, for example, be measured or quantified against a scale showing accumulated CPU utilization across the computers. The utilization 688 may, in some embodiments, be a count, fraction or percentage of the computers that are not idle.

The utilization 688 may be a count, fraction or percentage of computers having a processing load above a certain threshold level. The utilization 688 may be an indication of the amount of certain types of resources (e.g., processors, memory, bandwidth, ports) consumed by load balanced computers in processing assigned requests or otherwise. The utilization 688 of the computer farm may be scaled or measured against historical records, such as peak usage of computer resources over a period of time (e.g., over a cyclical period identified from a recognizable usage pattern). The utilization 688 of a computer farm may be a fraction or percentage of computers or resources available to the load balancer, e.g., excluding computers that are inoperative or removed for maintenance.

The maintenance agent may remove one or more computers for maintenance, upgrade, servicing, repair or replacement. In order to avoid possible service unavailability or degradation, the maintenance agent or an administrator may determine a level of utilization that can support predicted or projected usage levels. Alternatively, the maintenance agent or an administrator may determine the amount of spare capacity from the load balanced group of computers that can support predicted or projected usage levels. Although the discussion that follows may generally and illustratively refer to utilization instead of spare capacity, it is understood that either concept may be used to gauge service availability, and determine if a computer may be removed for maintenance, for example.

In certain embodiments, the maintenance agent or an administrator may determine a level of utilization that can further support some level of unanticipated usage demand. This level of utilization may be set as a threshold, below which a computer may be removed from the computer farm for maintenance for example. This level of utilization may be selected such that there is low or minimal risk of service unavailability from the remaining pool of load balanced computers. This level of utilization may be determined from statistical analysis of historical data, trends and anticipated needs. This level of utilization may be dynamically determined in real time or substantially in real time. Therefore, as computers are removed, and/or when actual or predicted usage levels change in time, this ("safe") level of utilization, or threshold, may be recalculated or adjusted by the maintenance agent.

The maintenance agent 676 may remove a computer for maintenance if actual (present) utilization 688 is below the threshold. In certain embodiments, the maintenance agent 676 can remove a computer for maintenance if utilization of the load balanced pool of computers after the removal is expected to be below the threshold. In some embodiments, the load balancer 255 determines this safe level of utilization. The load balancer 255 may permit the maintenance agent 676 to remove a computer if actual utilization is below this threshold. The load balancer 255 may permit the maintenance agent 676 to remove a computer if utilization of the load balanced pool of computers after the removal is expected to be below the threshold. Similarly, a threshold may be set for spare capacity, above which there is low or minimal risk of service unavailability from the remaining pool of load balanced computers. The load balancer 255 may compare actual spare capacity of the load balanced computers to this threshold to determine whether to remove a computer for maintenance.

In certain embodiments, the load balancer 255 removes a computer for maintenance by the maintenance agent 676 according to the utilization 688 or spare capacity of the load balanced computers. The maintenance agent 676 and/or the load balancer 255 may remove a group of computers from the land balanced pool of computers 102A-N based on the utilization 688 or spare capacity of the load balanced computers. In some embodiments, the utilization 688, spare capacity and/or corresponding threshold may be determined for a group or subclass of computers in the load balanced pool of computers 102A-N, for example, computers providing a certain type of service and/or having a similar configuration in hardware and/or software. In various embodiments, the threshold is determined based on the available or spare capacity of the load balanced group of computers to handle requests.

As discussed above, the maintenance agent 676 may receive a directive or communication that one or more computers are due for maintenance. In some embodiments, the communication comprises a request or advertisement for an update or new installation. The maintenance agent 676 may determine that one or more computers are due for maintenance based on monitoring, or communicating with the one or more computers 102A-N. The maintenance agent 676 may mark or otherwise identify the status of each of such computers as requiring maintenance, servicing, repair, upgrade or update. The maintenance agent 676 may mark or otherwise identify each of such computers as having out-of-date or outdated configuration or maintenance.

Similarly, the maintenance agent 676 can identify or mark a computer as having up-to-date maintenance, servicing, configuration and/or repair. Such a computer may sometimes be described as not requiring maintenance, not due for maintenance, fully-maintained, updated, or up-to-date. In certain embodiments, the maintenance agent 676 may mark a computer by tagging a status identifier against an identifier of the computer, such as in a list, table, directory, database or logfile, which may be maintained in the maintenance agent 676 or at a central location (e.g., on a server). The maintenance agent 676 may mark a computer by updating a field of the computer's configuration, status or setting. The maintenance agent 676 may mark a computer by assigning the computer to a group or class, e.g., a group of computers requiring maintenance.

In various embodiments, the maintenance agent 676 and/or the load balancer 255 may identify, determine and/or mark a computer as requiring maintenance or having up-to-date maintenance. The maintenance agent 676 may identify to the load balancer 255 whether a computer requires maintenance or has up-to-date maintenance, e.g., via the maintained information in the list, table, directory, database or logfile. The maintenance agent 676 may convey this information by identifying the group to which a computer is assigned, e.g., up-to-date or requiring maintenance. In some embodiments, the load balancer 255 requests maintenance status from the computers, e.g., as updated in the computer's configuration, status or settings. The load balancer may also request the maintenance status of any computer or group of computer from the maintenance agent 676.

The load balancer 255 may assign a request to a computer of the plurality of computers 102A-N based at least in part on any of the methods discussed above in connection with FIGS. 2A through 3C. The load balancer 255 may be configured to prefer one or more computers over other computers in assigning a request. The preference may be based on any one or more of: the level of load on a computer, the level of load on a computer relative to another computer, a metric of the computer, the number of active requests assigned to the computer, a state or status of the computer, a group to which the computer belongs, and user-specified preference or administrator-specified preference.

In some embodiments, the load balancer 255 may prefer to assign a request to an up-to-date computer instead of to a computer requiring maintenance. The load balancer 255 may prefer to assign a request to an up-to-date computer with a level of load below a predetermined threshold level, instead of to a computer requiring maintenance. Such an up-to-date computer may include a computer that is in an offline state, e.g., in sleep, hibernation, power-down, low-power, inactive mode or offline. A computer in an offline state may be part of the pool of available computers for load balancing. In some embodiments, a computer in an offline state may be excluded from the pool of available computers for load balancing. The load balancer 255 may, in some circumstances or embodiments, prefer to assign a request to a computer that is not offline. For example, a request may be processed more promptly if assigned to a computer that is not offline.

In some embodiments, assignment of the request is in accordance with an opportunistic approach that avoids service outage or unavailability. For example, the load balancer 255 may prefer to assign a request to a computer requiring maintenance, rather than a computer that is up-to-date, if the latter computer has a processing load above a predetermined threshold. The load balancer 255 may prefer to assign a request to a computer requiring maintenance, rather than a computer that is up-to-date, if the latter computer has a processing load at or near the predetermined threshold. The load balancer 255 may decide not to assign a request to an up-to-date computer if assigning the request may raise its processing load above the predetermined threshold. In yet other embodiments, the load balancer 255 may decide to assign a request to a computer even if assigning the request may raise its processing load above the predetermined threshold. The load balancer 255 may prefer to assign a request to a computer requiring maintenance and having a processing load below a first predetermined threshold, rather than a computer that is up-to-date and having a processing load at, near and/or above a second predetermined threshold. In certain embodiments, the first and second predetermined thresholds may be configured to be the same value or a different value.

A threshold may be predetermined for each computer, computer type, computer group, service and/or load type that the computer provides. In some other embodiments, the load balancer 255 may prefer to assign a request to a computer identified as idle and requiring maintenance, rather than a computer that is up-to-date, for various reasons. The load balancer 255 may prefer to assign a request to a computer identified as requiring maintenance, rather than another computer identified as requiring maintenance, due to particular characteristics of each computer, such as individual capabilities, capacity, state, status, a predetermined order of preference, assigned group, computer type, time from the last maintenance, number of previous attempts at performing maintenance, the amount, type, importance and/or duration of maintenance to be performed, and its present relation to a pre-assigned maintenance window.

In some embodiments, some of these factors may result in, or have an influence on the load balancer's preference or decision to assign a request to a computer identified as requiring maintenance, rather than another computer identified as up-to-date. Some of these factors may result in, or have an influence on the load balancer 255 preferring to assign a request to a computer rather than another computer, both with the same maintenance status and/or load levels. In certain embodiments, some of these factors may result in, or have an influence on the load balancer 255 preferring to assign a request to a computer identified as up-to-date, rather than another computer identified as requiring maintenance. In some embodiments, some of these factors may result in, or have an influence on the load balancer 255 preferring to assign a request to a computer having some processing load, rather than another computer identified as idle.

In some embodiments, an administrator may use a task scheduler module 677 of the management system 600 to configure certain operations of the maintenance agent. The task schedule may provide a user interface for an administrator. The user interface may include aspects or features of a command line interface and/or a graphical user interface. An administrator may select or provide maintenance updates or tasks to propagate to one or more computers. Certain maintenance updates or tasks may be assigned to particular computer groups, including computer groups within a larger group of load balanced computers 102A-N. The user interface may further provide status and reporting features for various tasks and processes such as a maintenance roll-out.

An administrator may specify, via the user interface, a maintenance window for performing a maintenance update or task on a computer or a group of computers. Groups of computers may be specified or defined according to an application or service that these computers provide. These groups may be referred to as application silos or worker groups. In some embodiments, a maintenance window specifies a period of time during which the maintenance agent may try to remove a computer from the load balanced group for maintenance. In certain embodiments, a maintenance window specifies a period of time during which no requests may be sent to a computer, so that the computer may be maintained when it is idle (i.e., is drained of processing load from requests). A maintenance window may specify a period of time during which requests being processed on a computer are moved or terminated, so that maintenance on the computer may be performed when it is idle. A maintenance window for a computer may specify a period of time during which new requests are preferably assigned to other computers, so that the computer may be maintained when it becomes idle. A maintenance window may comprise a duration of any predetermined or arbitrary length of time, such as an hour, a day or a week.

In some embodiments, the maintenance agent automatically sets a maintenance window for a computer when a maintenance update or task is issued, advertised, due or requested. An administrator or the maintenance agent 676 may set a plurality of maintenance windows for a particular maintenance update or task. For example, additional maintenance windows may be set if maintenance was not successful during a first maintenance window. The plurality of maintenance windows may be scheduled over any period of time, for example, over several days. The maintenance agent 676 may find no opportunity to remove the computer from the load balanced group for maintenance, for example, due to a processing load that was not fully drained, high number of requests, or an unsuccessful application of a patch. In some embodiments, the maintenance agent 676 automatically sets additional maintenance windows when maintenance was not completed successfully within a first window. In other embodiments, the maintenance agent 676 or administrator may set several windows upfront, or over a period of time, in response to a maintenance update or task which is issued, advertised, due or requested. This reflects an opportunistic process of removing a computer for maintenance when the computer is idle and/or when there is spare capacity in the system.

In some embodiments, a maintenance update or task may be performed while a computer is processing a request, or otherwise not idle. For example, the maintenance task may include a virus scan that can run in the background. In some virtualization environments, a patch, such as a virtual disk patch or a virtual application package, may be issued for distribution to a plurality of virtual machines hosted by one or more computers. Some patches may be applied to the virtual machines or computers while a request is being processed (e.g., when a user session is in progress). For example, some of the updates may involve publishing a new application to a user, or updating an existing component that is not currently used for processing any requests. In some of these cases, the maintenance agent may not have to set a maintenance window for a respective task or update, wait for the computer to become idle, and/or remove the computer from a load balanced group. Accordingly, the maintenance agent may recognize such tasks or updates, and perform the maintenance while minimizing impact to a load balanced configuration of computers.

Figure 4B:
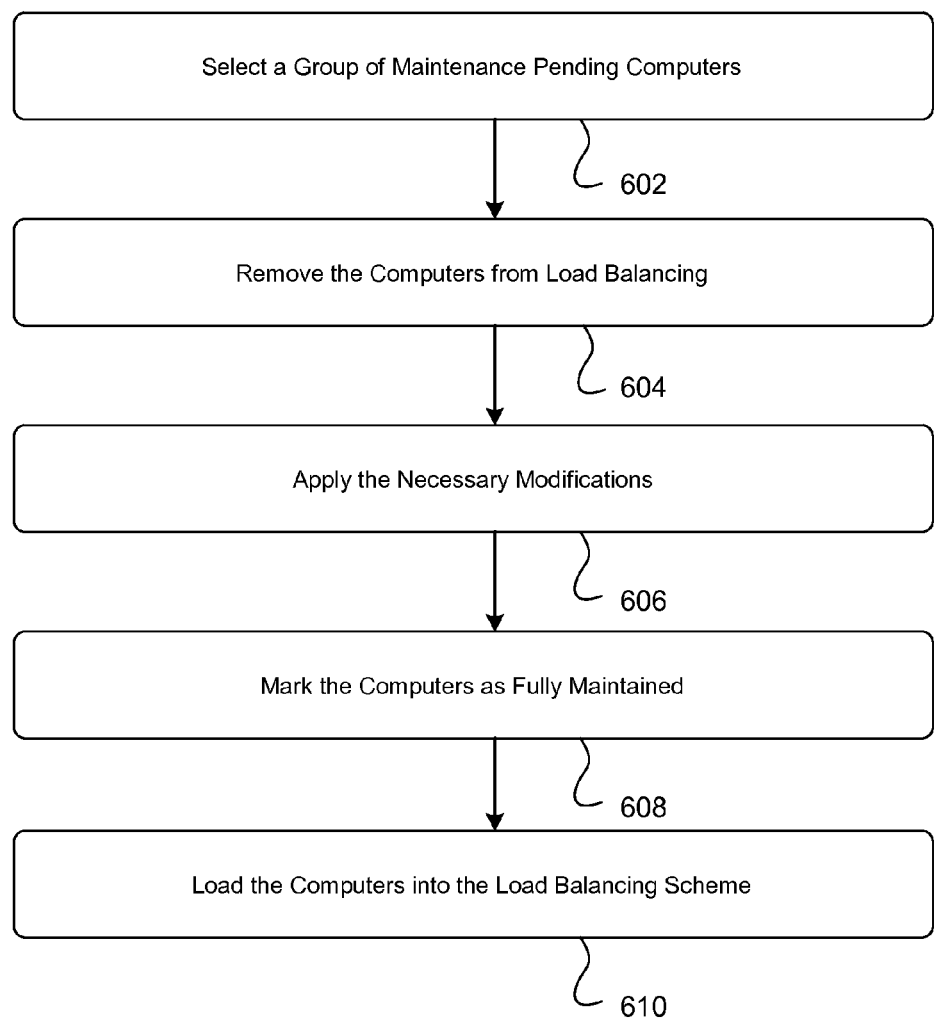
FIG. 4B is a flow diagram illustrative of an embodiment of a method for performing maintenance on computers in a load balanced environment.

Illustrated in FIG. 4B is one embodiment of a method for updating or performing maintenance on computers in a load balanced environment. An automated maintenance routine, carried out by a maintenance agent or load balancer executing on a computer that can access each of the computers included in the group of load balanced servers, selects a group of maintenance pending computers (Step 602). The maintenance agent then removes the selected computers from the load balancing group (Step 604) and applies the necessary modifications and updates to the selected computers (Step 606). The maintenance agent then marks the updated computers as fully maintained (Step 608) and loads the fully maintained computers into the load balancing scheme (Step 610).

Further referring to FIG. 4B, and in more detail, in one embodiment the maintenance agent selects a group of maintenance pending computers (Step 602). In some embodiments, computers that are included in a load balanced group of computers can be marked as "fully maintained" or "maintenance pending." Marking a computer can include inserting a status value into a table that tracks the status of each computer. In another embodiment, each computer can include metadata, a file or other piece of data that can be configured to state either "fully maintained" or "maintenance pending." In still another embodiment, a status monitor can monitor the status of each computer in the load balanced group. When, in this embodiment, the maintenance agent issues a request for a listing of each computer marked as "maintenance pending," the status monitor can respond to the maintenance agent's request with a list of all the computers having a status of "maintenance pending." In one aspect, the number of computers selected by the maintenance agent can depend on the utilization of the rest of the load group and system administration policies. When, in some embodiments, the group utilization is too high, the maintenance process may wait until enough spare capacity becomes available before attempting to maintain unused computers.

In some embodiments, a load balancer can be aware of the status of each computer in the group of load balancing computers and can prefer to choose those computers having the status "fully maintained" over those computers having the status "maintenance pending." In this embodiment, if these computers can handle new requests, a load balancer that enforces the load balancing scheme can select loaded, fully maintained computers before unloaded, maintenance pending computers. The load balancer can, in some embodiments, make this choice up to a configurable load limit that can be calculated based on computer utilization rules such as the number of requests, CPU utilization, etc. Load balancing that is accomplished according to these policies can result in a group of "maintenance pending" load balanced computers that can be fully drained, e.g. they do not process any computing requests. This can occur when the group of load balanced servers are not under peak capacity.

The load balancer 255 can retain and manage the selected "maintenance pending" computers in the group of load balanced computers. For example, the load balancer may want to maintain, increase or maximize availability of a service, including availability from maintenance pending computers. In another instance, the maintenance agent may remove the selected "maintenance pending" computers from the group of load balanced computers (Step 204). Removing these computers from the group can include instructing the load balancer to stop issuing requests to a select group of computers in the group of load balanced computers. In other embodiments, removing the computers from the group can include not making the computers available to the load balancer.

In virtualization environments, the maintenance performed can be maintenance that includes changing the base disk image version of the group of load balanced computers. For example, in provisioning services, patch updates may be distributed in the form of base image updates. In some embodiments, patch updates may be implemented in the form of delta disk images, representing changes relative to a base image configured in a machine or virtual machine. The methods described herein can facilitate such maintenance which can increase resiliency by allowing administrators to revert to previous image versions when problems are detected. The ability to roll back of an image may reduce the risks of maintenance failure.

The maintenance agent can then apply the necessary modifications (Step 606) and mark the computers as "fully maintained" (Step 608). In some embodiments, applying the necessary modifications can include maintaining, updating or otherwise installing applications and services on the servers. In other embodiments, applying the necessary modifications can include applying patches and performing security checks on the computers. Still other embodiments may include reimaging the computers, by replacing or updating a disk image or virtual disk image. Marking the computers as fully maintained can be done by entering in an entry into a table, list or database indicating that a particular computer is "fully maintained." In other embodiments, marking the computers can include modifying a file or metadata of the computers from "maintenance pending" to "fully maintained."

Upon marking each of the computers as "fully maintained," the maintenance agent then loads each computer back into the load balancing scheme (Step 610). Launching or loading the computers back into the load balancing group can include placing the computers back on a network where the load balancer can access the computers. In other embodiments, launching or loading the computers can include removing any restrictions from the load balancer, where the restrictions can include a mechanism for preventing the load balancer from issuing requests to the computers. In one embodiment, the load balancer can load the maintained or just-patched computers. In this embodiment, the load balancer can then let the remaining maintenance pending computers drain their request queue so that those computers can be maintained. By selecting a new group of maintenance pending computers just as the now fully maintained computers are launched back into the group, the maintenance agent can permit all computers in the group to perform maintenance routines.

Figure 4C:
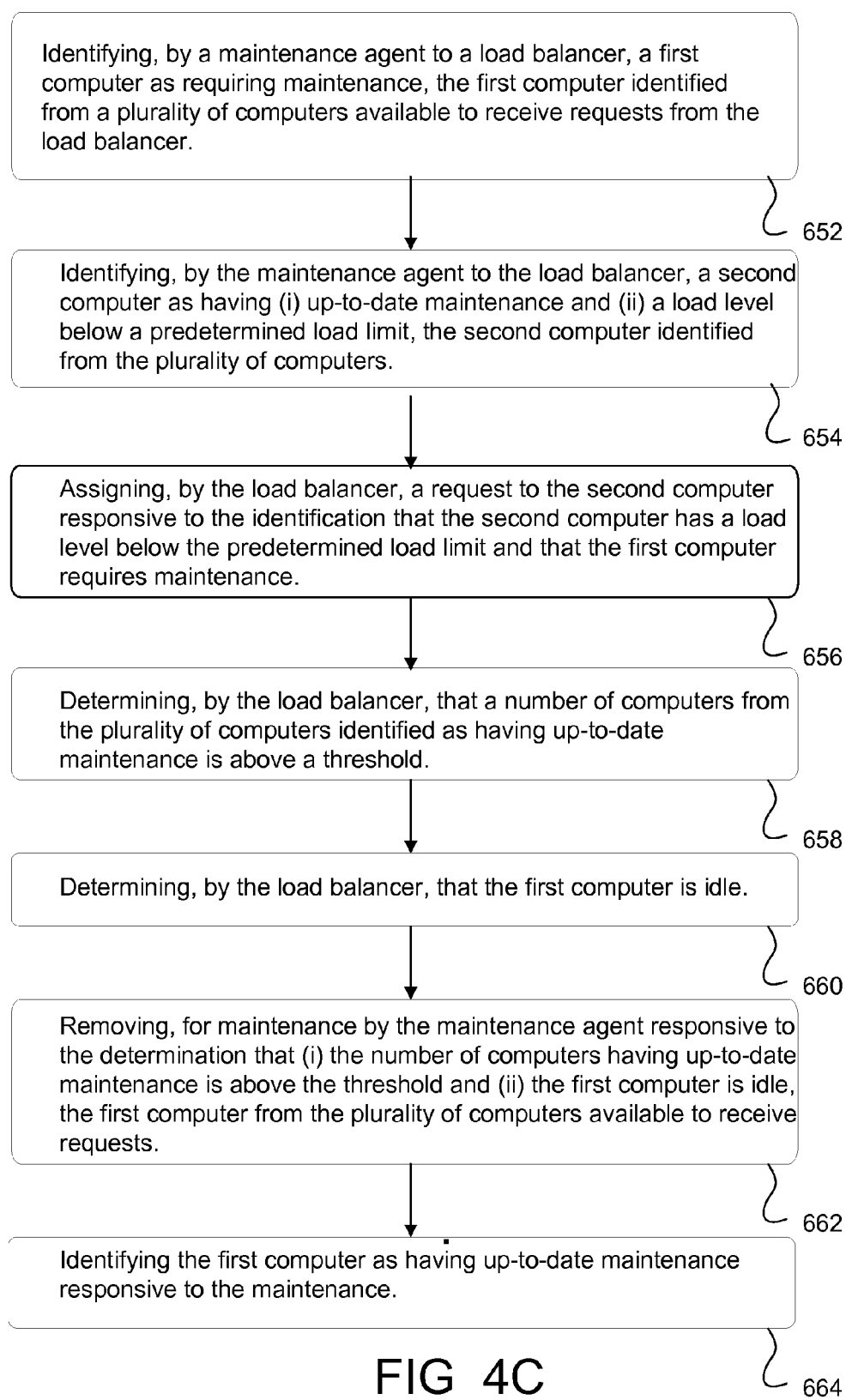
FIG. 4C is a flow diagram illustrative of another embodiment of a method for performing maintenance on computers in a load balanced environment.

Illustrated in FIG. 4C is another embodiment of a method for performing maintenance on computers in a load balanced environment. The various steps in FIG. 4C may incorporate any embodiment of the steps and features discussed above in connection with FIGS. 4B and 4C. A maintenance agent identifies to a load balancer, a first computer as requiring maintenance (Step 652). The first computer may be identified from a plurality of computers available to receive requests from the load balancer. The maintenance agent identifies to the load balancer, a second computer as having up-to-date maintenance and a load level below a predetermined load limit (Step 654). The second computer may be identified from the plurality of computers. The load balancer may assign a request to the second computer responsive to the identification that the second computer has a load level below the predetermined load limit and that the first computer requires maintenance (Step 656). The load balancer may also determine that a number of computers from the plurality of computers identified as having up-to-date maintenance is above a threshold (Step 658). The load balancer may determine that the first computer is idle (Step 660). Responsive to the determination that (i) the spare capacity from the plurality of computers available to receive requests is above the threshold and (ii) the first computer is idle, the maintenance agent may remove the first computer from the plurality of computers for maintenance (Step 662). The maintenance agent may identify the first computer as having up-to-date maintenance responsive to the maintenance (Step 664).

Further referring to FIG. 4C, and in more detail, the maintenance agent identifies to a load balancer a first computer as requiring maintenance (Step 652). The first computer may be identified from a plurality of computers available to receive requests from the load balancer. In some embodiments, the maintenance agent 676 identifies the computer from a specified group of computers, the group associated with an application type, a service type, a computer type or a user classification, for example. The maintenance agent 676 may request maintenance and/or processing status of one or more computers from the plurality of computers. In some embodiments, the maintenance agent 676 may identify a first computer as requiring maintenance based in part on the requested status.

The maintenance agent 676 may determine that the computer 102 is due for any type of maintenance update or task, such as those discussed above in connection with FIGS. 4A and 4B. For example and in some embodiments, the maintenance agent 676 may detect or determine that the first computer is due for at least one of: a patch update, disk image update, program installation or removal, a service update, a security check, storage maintenance, memory or cache clean-up, configuration update, physical component repair, and data corruption repair. The maintenance agent 676 may detect that the computer is not up-to-date based on certain aspects of its configuration or maintenance. For example, the maintenance agent 676 may determine that a computer is not up-to-date based on a review of the computer's maintenance records. The maintenance agent 676 may detect that a patch installed on the computer has been recalled or is outdated.

The maintenance agent 676 may, in some embodiments, receive a request from a computer for maintenance. The maintenance agent 676 may receive a notification that a maintenance update for a computer is available. The maintenance agent 676 may receive instructions from an administrator or a task scheduler 677 to perform maintenance on the computer. In certain embodiments, the maintenance agent 676 may refer to a directory, logfile, record or database to determine if a computer requires maintenance. The maintenance agent 676 may retrieve information, such as configuration or status information, from a computer, which indicates or helps determine whether the computer requires maintenance. The maintenance agent 676 may convey any of these information to the load balancer 255.

In various embodiments, the load balancer 255 receives a maintenance status of a computer from one or more of: the computer, a maintenance agent 676, a task manager, a directory, logfile, record, database, and an administrator. The maintenance agent 676 or the load balancer may mark a computer as requiring maintenance. The marking may be performed via any of the methods and means described above, for example in connection with FIGS. 4A and 4B. For example, the maintenance agent 676 may identify or mark a computer by updating a maintenance status of the first computer in a table tracking maintenance status of at least some of the plurality of computers, and/or tagging on the first computer the maintenance status of the first computer, the maintenance status indicating that maintenance is not up-to-date.

In some embodiments, the maintenance agent 676 may perform any of the identification or marking on one or more of the plurality of computers available to receive requests from the load balancer. The maintenance agent 676 may operate on the computers sequentially and/or in parallel. In some embodiments, the maintenance agent 676 may target a particular group or groups of computers from a load balanced pool for determining which computers require maintenance.

In certain embodiments, the maintenance agent 676, in communication with the load balancer 255, may allow a computer identified as requiring maintenance, to complete processing of requests assigned to the first computer. These requests may be assigned prior to identification that the first computer lacks up-to-date maintenance. The maintenance agent 676 may further allow other processes executing on the computer to complete or drain out. In some embodiments, the maintenance agent 676 instructs the computer to facilitate or accelerate completion of a process running on the computer. The maintenance agent 676 may also save, migrate or terminate a process running on the computer. In some embodiments, an existing process is allowed to execute, unaffected, on the computer.

Referring again to FIG. 4C, the maintenance agent identifies, to the load balancer, a second computer as having up-to-date maintenance and a load level below a predetermined load limit (Step 654). The second computer may be identified from the plurality of computers. The maintenance agent 676 may identify such a computer using any of the means and features described above in connection with FIGS. 4A, 4B and step 602. For example, the maintenance agent 676 may identify the maintenance status and/or load level of the computer via a monitoring agent executing on the computer. The maintenance agent 676 may determine that a computer is up-to-date based on a previous completed maintenance event and/or that no new notification of an available or mandatory update was issued.

In some embodiments, the maintenance agent 676 may identify a computer as up-to-date because it was not identified as requiring maintenance in step 602. Conversely, the maintenance agent 676 may determine, by default, that a computer requires maintenance unless it is specifically identified as up-to-date. The maintenance agent 676 determine whether a computer is up-to-date or requires maintenance based on any of the operations described in step 602. In some embodiments, the determination of whether a computer is up-to-date or requires maintenance is performed separately and/or independently of a determination of the load level. In certain embodiments, both determinations of maintenance status and load level are done at the same time or within a certain acceptable time frame.

The maintenance agent 676 may receive or determine the load level of the computer, and compare this against a load limit. The maintenance agent 676 may, for example, determine the load level of the computer via the load balancer. The maintenance agent 676 may determine the load limit or threshold for the computer according to one or more policies, for example maintenance and load balancing policies. The maintenance agent 676 may determine the load limit dynamically, for example adjusting this limit according to the number of available computers, spare capacity in the load balanced pool, a configuration of the computer, or the load type on the computer. The maintenance agent 676 may retrieve the load limit from a directory or other database, maintained centrally or by the load balancer, for example. The maintenance agent 676 may dynamically compare the processing load of the computer against the load limit. The load balancer and/or the maintenance agent 676 may determine a processing load for the computer, averaged over a period of time, for comparison against the load limit or threshold. An average processing load may be determined in response to temporal fluctuations in the load levels of the computer.

The maintenance agent 676 may determine if the computer has sufficient spare capacity, e.g., for accepting a new request or a request of a certain type. The maintenance agent 676 may determine if the computer is preferred over another computer for receiving a request. The maintenance agent 676 may determine that the processing load of the computer is below the load limit for the computer. In some instances, the maintenance agent 676 may determine that the processing load is at or above the load limit for the computer. The load balancer may determine that a computer having a load level below its load limit is preferred over another computer having a load level below its respective load limit, for receiving a request. In some embodiments, the maintenance agent 676 may determine that a computer identified as having (i) up-to-date maintenance and (ii) a load level below a predetermined load limit, is a preferred computer for assigning a new request. The maintenance agent 676 may convey any of these information and/or preferences to the load balancer 255.

In some embodiments, the load balancer may assign a request to the second computer responsive to the identification that the second computer has a load level below the predetermined load limit and that the first computer requires maintenance (Step 656). The load balancer may be configured to preferably assign a request to a computer having up-to-date maintenance rather than a computer requiring maintenance. The load balancer may prefer to assign a request to a computer having up-to-date maintenance rather than a computer requiring maintenance. The load balancer may assign a request to the up-to-date computer based on the determination that the up-to-date computer has a load level below the predetermined load limit. The load balancer may assign a request to the up-to-date computer based on a determination that another available computer is not up-to-date. The load balancer may predispose assignment of new requests to up-to-date computers having spare capacity or a low processing load. The load balancer may predispose assignment of new requests away from computers that are not up-to-date.

In some embodiments, the load balancer 255 assigns a request to the computer that is due for maintenance if the up-to-date computer has a load level above the latter computer's predetermined load limit. The load balancer 255 may assign a request to the computer that is due for maintenance if that computer has a load level below its predetermined load limit. In some of these embodiments, the load balancer 255 may assign the request to the computer that is due for maintenance if that computer has spare capacity. The load balancer 255 may assign a request to the computer that is due for maintenance if no other up-to-date computers have load levels below their respective load limits. The load balancer may also account for other factors, such as the request type and the configuration of each computer, in determining which computer to assign a request.

The load balancer may determine that spare capacity from the plurality of computers available to receive requests is above a threshold (Step 658). The load balancer 255 may determine that the utilization of the plurality of computers available to receive requests is below a certain threshold. In some embodiments, the load balancer may determine that the number of computers, from the plurality of computers, identified as having up-to-date maintenance is above a threshold. The load balancer 255 may determine that the number of computers (e.g., up-to-date computers) having spare capacity is above a threshold. In certain embodiments, the load balancer 255 may determine that the risk of service outage, degradation or unavailability is low, such as in relation to removing a computer from the load balanced pool. In some other instances, however, the load balancer 255 may determine that the risk of service outage, degradation or unavailability is significant or high. For example, the load balancer may determine that spare capacity from the plurality of computers is below a threshold, or that the utilization of the plurality of computers is high or above a threshold.

In some embodiments, the load balancer determines the threshold based on certain utilization aspects of the plurality of computers. For example, the load balancer may determine the threshold based on a statistical analysis of load, or a utilization pattern of the load balanced computers. The load balancer may determine the threshold dynamically based on changing parameters such as the number of available computers in the load balanced pool, the number of computers requiring maintenance, and the type of requests received and/or being processed. In some embodiments, the load balancer averages the utilization or spare capacity over a period of time, and compares the result to the threshold.

Referring to Step 660, the load balancer may determine that the first computer is idle. The load balancer may monitor the load level of some or all computers in the plurality of computers. The load balancer may monitor the load level of some or all computers in particular groups of computers in the load balanced pool. The load balancer 255 may detect that the load level of a computer, such as the computer requiring maintenance, is low, trivial or insignificant. In certain embodiments, the load balancer may determine that all assigned requests to the computer are processed or completed. In some instances, the load balancer may determine that the computer is in a low-power, inactive, hibernation, sleep, power-saving, stand-by mode or state. In some cases, the load balancer 255 may determine that the processing load from requests assigned to the computer have been drained. Responsive to the threshold determination, the maintenance agent or load balancer 255 may determine whether to remove a computer identified as requiring maintenance from the plurality of computers for maintenance.

Responsive to the determination that the spare capacity from the plurality of computers available to receive requests is above the threshold, and the first computer is idle, the maintenance agent may remove the first computer from the plurality of computers for maintenance (Step 662). Based on the circumstances, the maintenance agent and/or load balancer 255 may remove a computer from the plurality of computers, for maintenance. The computer may be removed opportunistically based on the state of the computer and/or the spare capacity of the load balanced group. The computer may be removed if there is low risk of service outage or degradation. The computer may be removed if the computer is idle or not processing any assigned request. The computer may be removed during any of one or more maintenance windows scheduled for the computer. Further, the computer may be removed based on any one or more of the determinations described in step 658 and/or step 660.

By removing the computer, the load balancer may exclude or prevent the computer from receiving a new request. In some embodiments, the load balancer 255 may remove the computer from an assigned computer group. The load balancer may change a configuration of the computer to remove it from the load balanced pool. The load balancer may mark the computer as unavailable for load balancing, or remove the computer from a list of computers available to receive requests.

In some embodiments, the computer farm management system 600 or the load balancer updates the utilization 688 or spare capacity of the load balanced pool. The update may occur responsive to the removal of the computer. The computer farm management system 600, the load balancer and/or the maintenance agent 676 may update one or more policies responsive to the removal. For example, the maintenance agent 676 may modify a load balancing policy of a plurality of policies that the load balancer uses to assign a request. The one or more policies may be updated based on the updated utilization 688 or spare capacity of the load balanced pool.

Further, and in some embodiments, responsive to the threshold determination, the maintenance agent or load balancer 255 may determine whether to remove a third or additional computer, identified as requiring maintenance, from the plurality of computers for maintenance. The maintenance agent or load balancer 255 may determine that the load balanced group has sufficient spare capacity or service availability to operate without another computer.

The load balancer may, in some embodiments, determine that a maintenance update or task due for the computer can be performed without affecting ongoing processes on a computer. In such a case, the load balancer 255 may ignore one or more requirements for removing a computer for maintenance. For example, the computer may not have to idle, or be maintained within a scheduled window. In some embodiments, the load balancer may determine not to remove the computer from the load balanced pool. The maintenance agent may perform maintenance, or selected portions thereof, while the computer is part of the load balanced pool and/or servicing a request.

The maintenance agent may identify the first computer as having up-to-date maintenance responsive to the maintenance (Step 664). Subject to successful completion of maintenance on the computer, the maintenance agent 676 may identify the computer as up-to-date. The maintenance agent 676 may update the maintenance status of the computer in a database, directory or logfile. The maintenance agent 676 may mark the maintained computer as up-to-date according to the different embodiments described above in connection with FIGS. 4A and 4B. Upon completion of maintenance, the maintenance agent 676 may indicate to the load balancer that the computer can be added back to the load balanced pool for receiving requests. In some embodiments, the load balancer may evaluate, examine or test the maintained computer prior to deploying the computer for load balancing. In certain embodiments, the load balancer may identify the up-to-date computer as a preferred computer for receiving requests. The load balancer may assign an up-to-date computer to a different group, for example, responsive to a change in configuration on the computer.

In some embodiments, the maintenance on the computer may be incomplete or unsuccessful. The maintenance agent 676 and/or load balancer may return the computer to the load balanced pool, for example, based on increased load on the load balanced pool. The maintenance agent 676 may restore the state of a computer, for example, in the case of an unsuccessful or defective maintenance or patch. In some embodiments, the maintenance agent 676 may schedule the computer for incremental maintenance, or re-application of a patch. In detecting a patch or installation failure, the maintenance agent 676 may, for example, revert back to a previous patch, installation or disk image version. The maintenance agent 676 and load balancer may in some circumstances (e.g., due to incomplete maintenance) determine that the computer should remain offline or be excluded from the load balanced pool. The maintenance agent 676 may perform additional maintenance or remedial work before the computer can be assigned an up-to-date status.

Using the methods and systems described, the process of providing maintenance to one or more computers in a load balanced environment may be automated or substantially automated. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for redirecting an access request from one virtual machine to another virtual machine, it will now become apparent to one of skill in the art that other embodiments incorporating the concepts of the invention may be used.

What is claimed is:

1. A method for updating a plurality of devices in a load balanced environment, comprising:
   (a) identifying, by a maintenance agent, a first device as requiring maintenance, the first device comprising one of a plurality of devices available to receive requests from a load balancer;
   (b) updating, in a maintenance tracking table, a maintenance status of the first device to indicate that maintenance of the first device is necessary;
   (c) determining, by the load balancer, that spare capacity from the others of the plurality of devices available to receive requests is above a threshold;
   (d) determining, by the load balancer, that the first device is idle; and
   (e) removing, for maintenance by the maintenance agent responsive to the determination that (i) the spare capacity from the plurality of devices available to receive requests is above the threshold and (ii) the first device is idle, the first device from the plurality of devices available to receive requests.

2. The method of claim 1, further comprising determining, by the load balancer, the threshold based on utilization of the plurality of devices.

3. The method of claim 1, wherein (a) further comprises detecting that the first device is due for at least one of: a patch update, disk image update, program installation or removal, a service update, a security check, storage maintenance, memory or cache clean-up, configuration update, physical component repair, and data corruption repair.

4. The method of claim 1, wherein the load balancer is configured to preferably assign a request to a device having up-to-date maintenance rather than a device requiring maintenance.

5. The method of claim 1, further comprising assigning a request to the first device if a second device has a load level above the predetermined load limit and the first device has a load level below the predetermined load limit.

6. The method of claim 1, wherein (a) further comprises allowing the first device to complete processing of requests assigned to the first device, the requests assigned prior to identification that the first device lacks up-to-date maintenance.

7. The method of claim 1, wherein (a) further comprises requesting, by the maintenance agent, maintenance and processing status of at least one device from the plurality of devices.

8. The method of claim 1, wherein (e) further comprises modifying, by the maintenance agent, a load balancing policy of a plurality of policies that the load balancer uses to assign a request.

9. The method of claim 1, wherein (e) further comprises determining, by the maintenance agent responsive to the threshold determination, whether to remove a third device identified as requiring maintenance, from the plurality of devices for maintenance.

10. A system for updating a plurality of devices in a load balanced environment, the system comprising:
   a load balancer; and
   a maintenance agent executing on a computing device, the maintenance agent:
      identifying a first device as requiring maintenance, the first device comprising one of a plurality of devices available to receive requests from the load balancer; and
      updating, in a maintenance tracking table, a maintenance status of the first device to indicate that maintenance of the first device is necessary;
   wherein the maintenance agent removes the first device from the plurality of devices for maintenance responsive to a determination that (i) spare capacity from the others of the plurality of devices available to receive requests is above a threshold and (ii) the first device is idle.

11. The system of claim 10, wherein the load balancer determines the threshold based on utilization of the plurality of devices.

12. The system of claim 10, wherein the maintenance agent detects that the first device is due for at least one of: a patch update, disk image update, program installation or removal, a service update, a security check, storage maintenance, memory or cache clean-up, configuration update, physical component repair, and data corruption repair.

13. The system of claim 10, wherein the load balancer is configured to preferably assign a request to a device having up-to-date maintenance rather than a device requiring maintenance.

14. The system of claim 10, wherein the load balancer assigns a request to the first device if a second device has a load level above the predetermined load limit and the first device has a load level below the predetermined load limit.

15. The system of claim 10, wherein the load balancer allows the first device to complete processing of requests assigned to the first device, the requests assigned prior to identification that the first device lacks up-to-date maintenance.

16. The system of claim 10, wherein the maintenance agent requests maintenance and processing status of at least one device from the plurality of devices.

17. The system of claim 10, wherein the maintenance agent modifies a load balancing policy of a plurality of policies that the load balancer uses to assign a request.

18. The system of claim 10, wherein the maintenance agent determines, responsive to the threshold determination, whether to remove a third device identified as requiring maintenance from the plurality of devices for maintenance.

* * * * *